(12) United States Patent     (10) Patent No.: US 12,567,618 B2

Oh et al.     (45) Date of Patent:    Mar. 3, 2026

---

(54) BATTERY PACK AND VEHICLE INCLUDING SAME

(71) Applicant: LG ENERGY SOLUTION, LTD., Seoul (KR)

(72) Inventors: Kwang-Keun Oh, Daejeon (KR); Jin-Oh Yang, Daejeon (KR); In-Hyuk Jung, Daejeon (KR); Hae-Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 602 days.

(21) Appl. No.: 17/923,540

(22) PCT Filed: Jan. 11, 2022

(86) PCT No.: PCT/KR2022/000501

§ 371 (c)(1),
(2) Date: Nov. 4, 2022

(87) PCT Pub. No.: WO2022/149964

PCT Pub. Date: Jul. 14, 2022

(65) Prior Publication Data

US 2023/0198045 A1     Jun. 22, 2023

(30) Foreign Application Priority Data

Jan. 11, 2021    (KR) ........................ 10-2021-0003551

(51) Int. Cl.
   *H01M 10/653*      (2014.01)
   *H01M 10/613*      (2014.01)
   (Continued)

(52) U.S. Cl.
   CPC ....... *H01M 10/653* (2015.04); *H01M 10/613* (2015.04); *H01M 10/625* (2015.04);
   (Continued)

(58) Field of Classification Search
None
See application file for complete search history.

(56) References Cited

U.S. PATENT DOCUMENTS

| | | |
|---|---|---|
| 2005/0170241 A1 | 8/2005 | German et al. |
| 2008/0311468 A1 | 12/2008 | Hermann et al. |

(Continued)

FOREIGN PATENT DOCUMENTS

| | | |
|---|---|---|
| CN | 107134557 A | 9/2017 |
| CN | 209401797 U | 9/2019 |

(Continued)

OTHER PUBLICATIONS

International Search Report (with partial translation) and Written Opinion dated Apr. 19, 2022, for corresponding International Patent Application No. PCT/KR2022/000501.

(Continued)

*Primary Examiner* — Scott J. Chmielecki

(74) *Attorney, Agent, or Firm* — Morgan, Lewis & Bockius LLP

(57) ABSTRACT

A battery pack according to an embodiment of the present disclosure includes a battery cell assembly including a plurality of battery cells; a busbar assembly on the battery cell assembly and electrically connected to the plurality of battery cells; a cooling unit below the busbar assembly and interposed between the plurality of battery cells along a lengthwise direction of the battery cell assembly; and a thermally conductive member disposed in a space between the cooling unit and the plurality of battery cells.

18 Claims, 19 Drawing Sheets

(51) Int. Cl.
    *H01M 10/625*    (2014.01)
    *H01M 10/6557*    (2014.01)
    *H01M 10/6568*    (2014.01)
    *H01M 50/507*    (2021.01)

(52) U.S. Cl.
    CPC ... *H01M 10/6557* (2015.04); *H01M 10/6568*
    (2015.04); *H01M 50/507* (2021.01); *H01M*
    *2220/20* (2013.01)

(56)             References Cited

U.S. PATENT DOCUMENTS

| | | | |
|---|---|---|---|
| 2011/0020686 A1 | 1/2011 | Yamamoto et al. | |
| 2011/0097617 A1* | 4/2011 | Gu | H01M 10/613 |
| | | | 429/120 |
| 2013/0034767 A1* | 2/2013 | Pentapati | H01M 10/6556 |
| | | | 165/104.33 |
| 2013/0209858 A1 | 8/2013 | Schmitt et al. | |
| 2015/0140388 A1 | 5/2015 | Harada et al. | |
| 2015/0188203 A1* | 7/2015 | Enomoto | H01M 10/613 |
| | | | 429/83 |
| 2016/0172727 A1 | 6/2016 | Chan et al. | |
| 2019/0148681 A1 | 5/2019 | Park et al. | |
| 2019/0214694 A1 | 7/2019 | Yang et al. | |
| 2020/0006739 A1* | 1/2020 | Sato | H01M 50/209 |
| 2020/0076022 A1* | 3/2020 | Kawakami | H01M 50/581 |
| 2020/0127350 A1 | 4/2020 | Lee et al. | |
| 2020/0176746 A1 | 6/2020 | Yamada et al. | |
| 2020/0185795 A1* | 6/2020 | Park | H01M 10/6552 |
| 2020/0227799 A1* | 7/2020 | Fukutome | H01M 50/213 |
| 2020/0321669 A1* | 10/2020 | Kim | H01M 10/6554 |
| 2021/0167343 A1* | 6/2021 | Kwag | H01M 10/4257 |
| 2021/0320343 A1* | 10/2021 | Flannery | H01M 10/6568 |
| 2021/0384566 A1* | 12/2021 | Jung | H01M 10/04 |
| 2022/0077520 A1* | 3/2022 | Donovan | H01M 10/6554 |
| 2022/0123388 A1* | 4/2022 | Alexander | H01M 10/6554 |
| 2022/0209331 A1* | 6/2022 | Sennoun | H01M 10/613 |
| 2022/0223960 A1 | 7/2022 | Boehm et al. | |
| 2022/0278386 A1* | 9/2022 | Cho | H01M 10/6553 |
| 2022/0302522 A1* | 9/2022 | Lee | B60L 58/26 |
| 2022/0384873 A1* | 12/2022 | Flannery | H01M 10/613 |
| 2022/0384880 A1* | 12/2022 | Flannery | H01M 10/443 |

FOREIGN PATENT DOCUMENTS

| | | | | |
|---|---|---|---|---|
| EP | 2643870 B1 | 7/2016 | | |
| EP | 3246978 B1 | 9/2020 | | |
| EP | 3828992 A2 * | 6/2021 | | H01M 50/278 |
| JP | 2005-222939 A | 8/2005 | | |
| JP | 2006-092935 A | 4/2006 | | |
| JP | 2008-251471 A | 10/2008 | | |
| JP | 2010-528406 A | 8/2010 | | |
| JP | 2010-225583 A | 10/2010 | | |
| JP | 2011-049013 A | 3/2011 | | |
| JP | 2012-9388 A | 1/2012 | | |
| JP | 2013-519987 A | 5/2013 | | |
| JP | 5512446 B2 | 6/2014 | | |
| JP | 2017-536658 A | 12/2017 | | |
| JP | 2020-30970 A | 2/2020 | | |
| JP | 2020-87872 A | 6/2020 | | |
| KR | 10-2017-0039445 A | 4/2017 | | |
| KR | 10-2018-0091600 A | 8/2018 | | |
| KR | 10-2019-0054897 A | 5/2019 | | |
| KR | 10-2019-0083533 A | 7/2019 | | |
| KR | 10-2020-0097236 A | 8/2020 | | |
| WO | 2012069417 A1 | 5/2012 | | |
| WO | 2013/171885 A1 | 11/2013 | | |
| WO | 2020/094364 A1 | 5/2020 | | |
| WO | 2020/094365 A1 | 5/2020 | | |
| WO | 2020/259879 A1 | 12/2020 | | |

OTHER PUBLICATIONS

Extended European Search Report dated Sep. 11, 2024 issued in European Patent Application No. 22736941.0.

Office Action issued in corresponding Chinese Patent Application No. 202280004748.1 dated Apr. 30, 2025.

* cited by examiner

BATTERY PACK AND VEHICLE INCLUDING SAME

TECHNICAL FIELD

The present disclosure relates to a battery pack and a vehicle comprising the same.

The present application claims the benefit of Korean Patent Application No. 10-2021-0003551 filed on Jan. 11, 2021 with the Korean Intellectual Property Office, the disclosure of which is incorporated herein by reference in its entirety.

BACKGROUND ART

Due to their characteristics of being easily applicable to various products and electrical properties such as a high energy density, secondary batteries are not only commonly applied to portable devices, but universally applied to electric vehicles (EVs) or hybrid electric vehicle (HEVs) that are driven by an electrical driving source. Such secondary batteries are gaining attention for their primary advantage of remarkably reducing the use of fossil fuels and not generating by-products from the use of energy, making it a new eco-friendly and energy efficient source of energy.

The types of secondary batteries widely used at present include lithium ion batteries, lithium polymer batteries, nickel cadmium batteries, nickel hydrogen batteries, nickel zinc batteries or the like. This unit secondary battery cell, i.e., a unit battery cell has an operating voltage of about 2.5V to 4.5V. Accordingly, when a higher output voltage is required, a plurality of battery cells may be connected in series to fabricate a battery pack. Additionally, the battery pack may be fabricated by connecting the plurality of battery cells in parallel according to the charge/discharge capacity required for the battery pack. Accordingly, the number of battery cells included in the battery pack may be variously set depending on the required output voltage or charge/discharge capacity.

Meanwhile, when fabricating the battery pack by connecting the plurality of battery cells in series/in parallel, it is general to make a battery module including at least one battery cell, and then fabricate a battery pack or a battery rack using at least one battery module with an addition of any other component.

In general, the conventional battery pack case includes a plurality of battery cells and a cell frame for accommodating the plurality of battery cells. In general, the conventional cell frame includes an assembly of a plurality of plates including a front plate, a rear plate, a side plate, a lower plate and an upper plate to accommodate the plurality of battery cells and ensure strength.

However, due to the characteristics of the cell frame structure including an assembly of a plurality of plates, the conventional battery pack has the increased fabrication cost and complex assembly process, and thus there are price competitiveness and fabrication efficiency disadvantages.

Furthermore, the conventional battery pack has an increase in its total size due to the cell frame structure including an assembly of a plurality of plates, and thus there is an energy density disadvantage.

DISCLOSURE

Technical Problem

Accordingly, the present disclosure is directed to providing a battery pack with increased energy density and strength and a vehicle comprising the same.

Additionally, the present disclosure is further directed to providing a battery pack with improved price competitiveness and fabrication efficiency and a vehicle comprising the same.

Furthermore, the present disclosure is further directed to providing a battery pack with improved cooling performance and a vehicle comprising the same.

Technical Solution

To solve the above-described problem, the present disclosure provides a battery pack including a battery cell assembly including a plurality of battery cells; a busbar assembly provided on the battery cell assembly and electrically connected to the plurality of battery cells; a cooling unit positioned below the busbar assembly and interposed between the plurality of battery cells along a lengthwise direction of the battery cell assembly; and a thermally conductive member filled in a space between the cooling unit and the plurality of battery cells.

The thermally conductive member may be filled in the busbar assembly to cover the busbar assembly at least in part.

The thermally conductive member may be continuously filled between the busbar assembly and the cooling unit in an up/down direction of the battery cell assembly.

The thermally conductive member may include a potting resin.

The cooling unit may include a cooling tube which is formed over a predetermined length along the lengthwise direction of the battery cell assembly and positioned between the plurality of battery cells, the cooling tube having a cooling channel for cooling water circulation inside; and a cooling water entrance/exit connected to the cooling tube such that the cooling water entrance/exit is in communication with the cooling channel of the cooling tube.

The cooling tube may be formed in a shape corresponding to an outer surface of the plurality of facing battery cells.

The cooling tube may have convex and concave portions arranged in an alternating manner along the lengthwise direction of the battery cell assembly.

The cooling water entrance/exit may be provided on a side of the lengthwise direction of the battery cell assembly, and the cooling tube may be formed over a predetermined length from the cooling water entrance/exit toward an opposite side of the battery cell assembly in the lengthwise direction of the battery cell assembly.

The cooling water entrance/exit may be positioned between the plurality of battery cells in the lengthwise direction of the battery cell assembly, and the cooling tube may be formed over a predetermined length from the cooling water entrance/exit toward two sides of the battery cell assembly in the lengthwise direction of the battery cell assembly.

The cooling channel may include at least one upper channel positioned on the cooling tube and formed over a predetermined length along the lengthwise direction of the cooling tube; at least one lower channel positioned below the cooling tube, spaced apart from the at least one upper channel, and formed over a predetermined length along the lengthwise direction of the cooling tube; and a connecting channel connecting the at least one upper channel to the at least one lower channel.

The cooling water entrance/exit may include an entrance/exit body connected to an end of the cooling tube; a cooling water feed port provided in the entrance/exit body and connected to the upper channel such that the cooling water feed port is in communication with the upper channel; and a cooling water outlet port provided in the entrance/exit body and connected to the lower channel such that the cooling water outlet port is in communication with the lower channel.

The connecting channel may be provided at an opposite end of the cooling tube.

The cooling tube may be positioned in contact with an outer surface of the plurality of battery cells.

The busbar assembly may include a pair of main busbars electrically connected to the battery cell assembly, and having a connector connected to a charge/discharge line; and a plurality of connecting busbars electrically connected to the pair of main busbars, and connected to positive and negative electrodes of the plurality of battery cells.

Additionally, the present disclosure provides a vehicle including at least one battery pack according to the above-described embodiments.

Advantageous Effects

According to the various embodiments as described above, it is possible to provide a battery pack with increased energy density and strength and a vehicle comprising the same.

Additionally, according to the various embodiments as described above, it is possible to provide a battery pack with improved price competitiveness and fabrication efficiency and a vehicle comprising the same.

Furthermore, according to the various embodiments as described above, it is possible to provide a battery pack with improved cooling performance and a vehicle comprising the same.

DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

FIG. 4 is a diagram illustrating a battery cell according to another embodiment of the battery cell assembly of FIG. 3.

FIG. 8 is a perspective view of the main parts of a cooling unit of the battery pack of FIG. 2.

FIG. 9 is a cross-sectional view of the main parts of the cooling unit of FIG. 8.

FIG. 11 is a perspective view of a bottom frame of the battery pack of FIG. 2.

FIGS. 15 and 16 are diagrams illustrating an electrical connection between a battery cell assembly and a busbar assembly of the battery pack of FIG. 1.

BEST MODE

The present disclosure will become apparent by describing a preferred embodiment of the present disclosure in detail with reference to the accompanying drawings. The embodiment described herein is provided by way of illustration to help an understanding of the present disclosure, and it should be understood that various modifications may be made to the present disclosure in other embodiments than the embodiment described herein. Additionally, to help an understanding of the present disclosure, the accompanying drawings are not shown in true scale and may depict some exaggerated elements.

Figure 1:
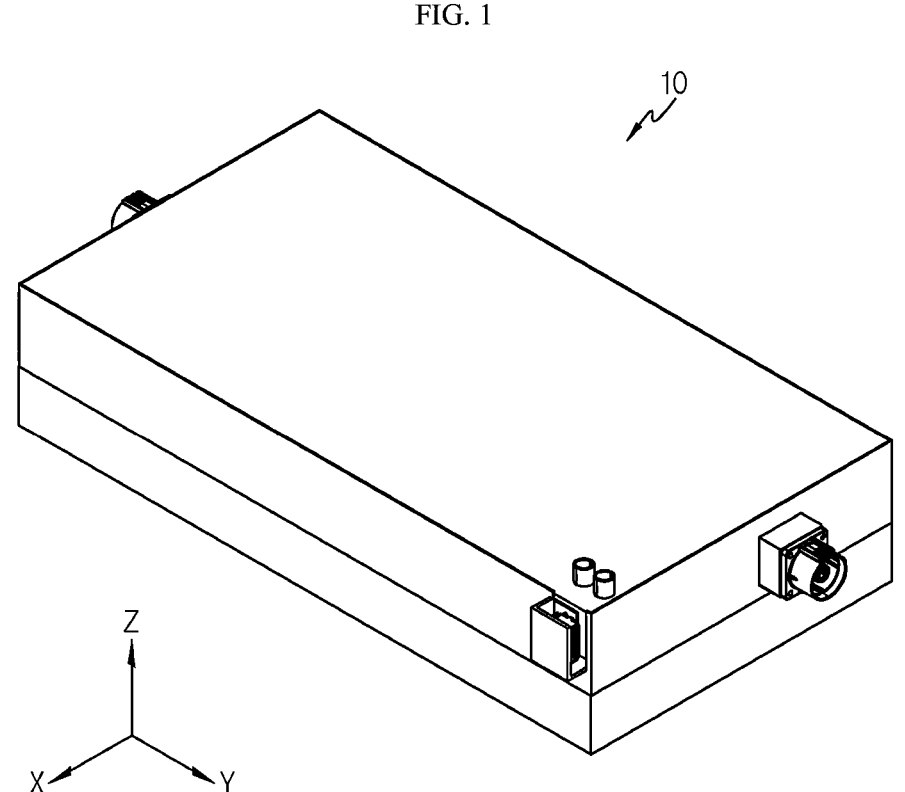
FIG. 1 is a diagram illustrating a battery pack according to an embodiment of the present disclosure.
Figure 2:
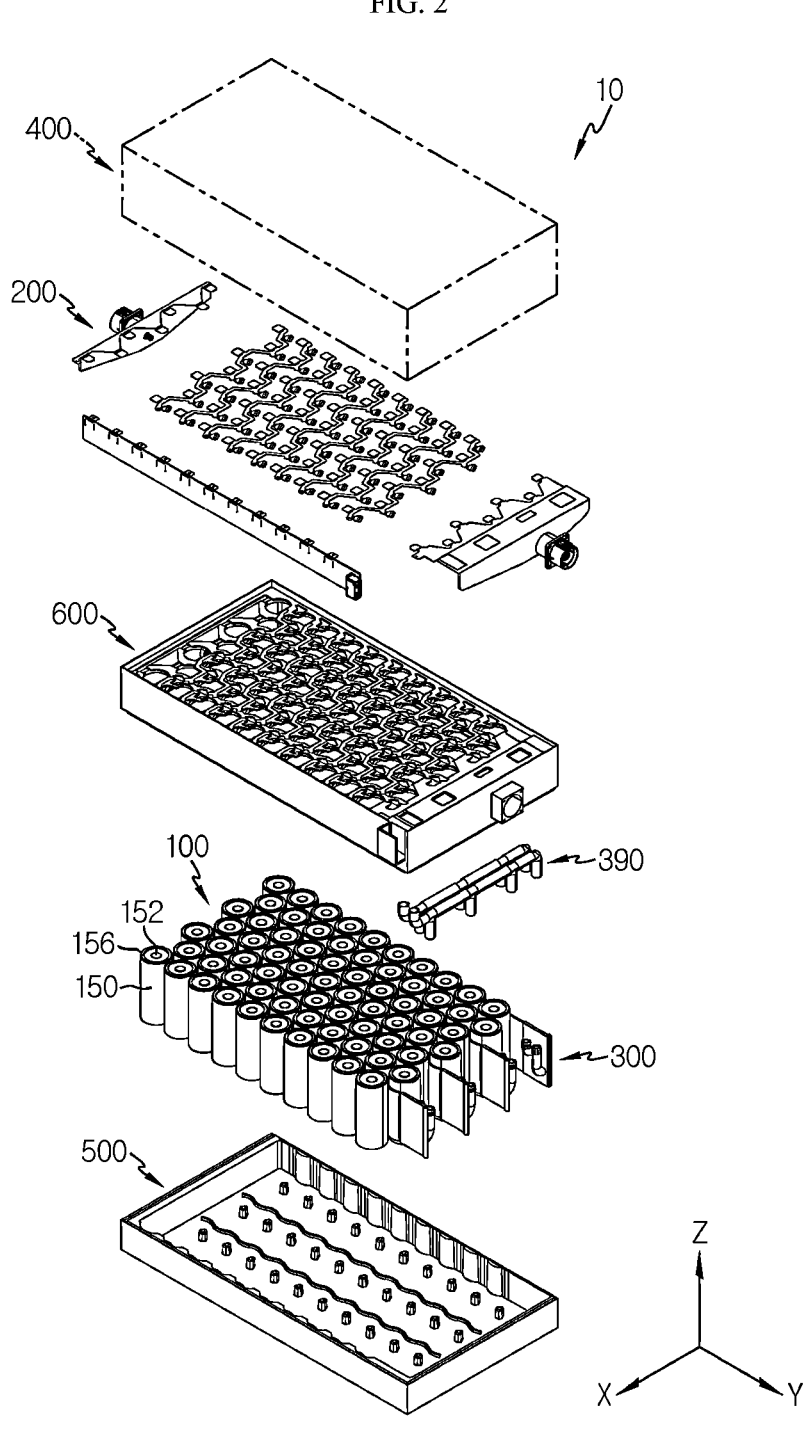
FIG. 2 is an exploded perspective view of the battery pack of FIG. 1.

FIG. 1 is a diagram illustrating a battery pack according to an embodiment of the present disclosure, and FIG. 2 is an exploded perspective view of the battery pack of FIG. 1.

Referring to FIGS. 1 and 2, the battery pack 10 may be provided in an electric vehicle or a hybrid electric vehicle as an energy source. Hereinafter, the battery pack 10 provided in the electric vehicle will be described in more detail in the following relevant drawings.

The battery pack 10 may include a battery cell assembly 100, a busbar assembly 200, a cooling unit 300 and a thermally conductive member 400.

The battery cell assembly 100 may include at least one battery cell 150. Hereinafter, in this embodiment, a description will be made based on the battery cell assembly 100 including the plurality of battery cells 150.

The plurality of battery cells 150 may include secondary batteries, for example, cylindrical secondary batteries, pouch type secondary batteries or prismatic secondary batteries. Hereinafter, this embodiment, a description is made based on cylindrical secondary batteries as the plurality of battery cells 150.

The plurality of battery cells 150 may be stacked such that they are electrically connected to each other. The plurality of battery cells 150 may have a positive electrode 175 and a negative electrode 170 together on top. Specifically, the positive electrode 175 of the battery cell 150 may be provided at the center of the top of the battery cell 150, and the negative electrode 170 of the battery cell 150 may be provided at the edge of the top of the battery cell 150.

In this embodiment, as described above, since both the positive electrode 175 and the negative electrode 170 of the plurality of battery cells 150 are provided on one side (+Z axis direction) of the battery cells 150, to be specific, the upper side (+Z axis direction) of the battery cells 150, it may be easier to establish the electrical connection to the busbar assembly 200 as described below.

Accordingly, in this embodiment, due to the structure in which the positive electrode 175 and the negative electrode 170 of the plurality of battery cells 150 are positioned in the same direction (+Z axis direction), compared to the structure in which the positive electrode and the negative electrode are positioned in either direction, it is possible to simplify the structure of connection to the busbar assembly 200 as described below, and reduce the volume occupied by the electrical connection structure.

Accordingly, in this embodiment, it is possible to achieve the compact structure and improved energy density of the battery pack 10 by simplifying the electrical connection structure of the battery cells 150 to the busbar assembly 200 as described below.

Hereinafter, each of the plurality of battery cells 150 will be described in more detail.

Figure 3:
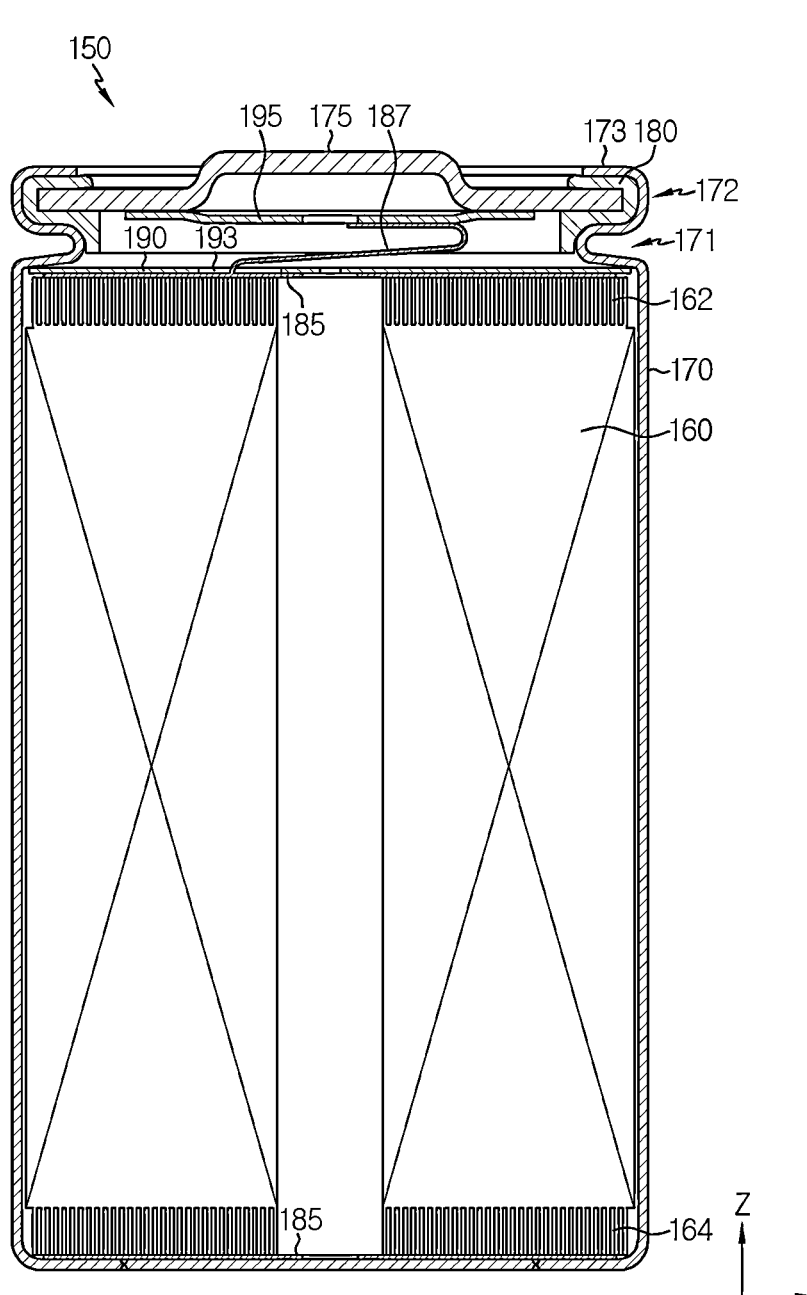
FIG. 3 is a diagram illustrating a battery cell of a battery cell assembly of the battery pack of FIG. 2.

FIG. 3 is a diagram illustrating the battery cell of the battery cell assembly of the battery pack of FIG. 2.

Referring to FIG. 3, the battery cell 150 may include an electrode assembly 160, a battery can 170 and a top cap 175. In addition to the above-described components, the battery cell 150 may further include a sealing gasket 180, a current collector plate 185, an insulation plate 190 and a connecting plate 195.

The electrode assembly 160 includes a first electrode plate having a first polarity, a second electrode plate having a second polarity and a separator interposed between the first electrode plate and the second electrode plate. The electrode assembly 160 may have a jelly-roll shape. That is, the electrode assembly 160 may be formed by winding a stack around a winding center C, the stack formed by stacking the first electrode plate, the separator, the second electrode plate at least once in that order. In this case, the separator may be provided on the outer peripheral surface of the electrode assembly 160 for insulation from the battery can 170. The first electrode plate is a positive or negative electrode plate, and the second electrode plate corresponds to an electrode plate having the opposite polarity to the first electrode plate.

The first electrode plate includes a first electrode current collector and a first electrode active material coated on one or two surfaces of the first electrode current collector. A noncoated region in which the first electrode active material is not coated exists at one end of the widthwise direction (parallel to the Z axis) of the first electrode current collector. The noncoated region may act as a first electrode tab 162. The first electrode tab 162 is provided at the upper part of the heightwise direction (parallel to the Z axis) of the electrode assembly 160 accommodated in the battery can 170.

The second electrode plate includes a second electrode current collector and a second electrode active material coated on one or two surfaces of the second electrode current collector. A noncoated region in which the second electrode active material is not coated exists at the other end of the widthwise direction (parallel to the Z axis) of the second electrode current collector. The noncoated region acts as a second electrode tab 164. The second electrode tab 164 is provided at the lower part of the heightwise direction (parallel to the Z axis) of the electrode assembly 160 accommodated in the battery can 170.

The battery can 170 is a cylindrical receiving structure having a top opening, and is made of a metal having conductive properties. The battery can 170 accommodates the electrode assembly 160 together with an electrolyte through the top opening.

The battery can 170 is electrically connected to the second electrode tab 164 of the electrode assembly 160. Accordingly, the battery can 170 has the same polarity as the second electrode tab 164. In this embodiment, the battery can 170 may act as the negative electrode 170.

The battery can 170 includes a beading portion 171 and a crimping portion 172 at the upper end. The beading portion 171 is formed on the electrode assembly 160. The beading portion 171 is formed by press-fitting the periphery of the outer peripheral surface of the battery can 170. The beading portion 171 may prevent the electrode assembly 160 having a size corresponding to the width of the battery can 170 from slipping out of the top opening of the battery can 170, and may act as a support on which the top cap 175 is seated.

A top edge 173 of the beading portion 171 of the battery can 170 may be inserted into or positioned in contact with a guide groove 249 of a negative electrode connection portion 248 of the busbar assembly 200 as described below. This is to make the welding process easier in the welding process for electrical connection between the busbar assembly 200 as described below and the battery can 170 that acts as the negative electrode 170.

The crimping portion 172 is formed on the beading portion 171. The crimping portion 172 may be extended and bent to cover the outer peripheral surface of the top cap 175 positioned on the beading portion 171 and part of the upper surface of the top cap 175.

The top cap 175 is a component made of a metal having conductive properties, and covers the top opening of the battery can 170. The top cap 175 is electrically connected to the first electrode tab 162 of the electrode assembly 160, and electrically insulated from the battery can 170. Accordingly, the top cap 175 may act as the positive electrode 175 of the battery cell 150.

The top cap 175 is seated on the beading portion 171 formed in the battery can 170 and is fixed by the crimping portion 172. The sealing gasket 180 may be interposed between the top cap 175 and the crimping portion 172 of the battery can 170 to ensure sealability of the battery can 170 and electrical insulation between the battery can 170 and the top cap 175.

The top cap 175 may have a protrusion that protrudes upwards from the center. The protrusion may guide the contact with an electrical connection component, for example, busbars.

The current collector plate 185 is coupled on the electrode assembly 160. The current collector plate 185 is made of a metal having conductive properties, and is connected to the first electrode tab 162. A lead 187 may be connected to the current collector plate 185, and the lead 187 may be extended upwards from the electrode assembly 160 and directly coupled to the top cap 175 or may be coupled to the connecting plate 195 coupled to the lower surface of the top cap 175.

The current collector plate 185 is coupled to the end of the first electrode tab 162. The coupling between the first electrode tab 162 and the current collector plate 185 may be performed by, for example, laser welding. The laser welding may be performed by partially melting the base material of the current collector plate 185, and may be performed with solders for welding interposed between the current collector plate 185 and the first electrode tab 162. In this case, the solder may have a lower melting point than the current collector plate 185 and the first electrode tab 162.

The current collector plate 185 may be coupled to the lower surface of the electrode assembly 160. In this case, one surface of the current collector plate 185 may be coupled to the second electrode tab 164 of the electrode assembly 160 by welding, and the opposite surface may be coupled to the inner bottom surface of the battery can 170 by welding. The coupling structure of the current collector plate 185 coupled to the lower surface of the electrode assembly 160 and the second electrode tab 164 is substantially the same as the current collector plate 185 coupled to the upper surface of the electrode assembly 160 described above.

The insulation plate 190 is positioned between the upper end of the electrode assembly 160 and the beading portion 171 or between the current collector plate 185 coupled on the electrode assembly 160 and the beading portion 171 to prevent the contact between the first electrode tab 162 and the battery can 170 or the contact between the current collector plate 185 and the battery can 170.

The insulation plate 190 has a lead hole 193 through which the lead 187 extended upwards from the current collector plate 185 or the first electrode tab 162 may come out. The lead 187 is extended upwards through the lead hole 193 and coupled to the lower surface of the connecting plate 195 or the lower surface of the top cap 175.

As described above, the battery cell 150 according to an embodiment of the present disclosure has a structure in which the top cap 175 provided on the upper side and the top edge 173 of the battery can 170 in the lengthwise direction (parallel to the Z axis in FIG. 2) of the battery can 170 are used as the positive electrode 175 and the negative electrode 170. Accordingly, in electrically connecting the plurality of battery cells 150 according to an embodiment of the present disclosure, the electrical connection component such as the busbar assembly 200 may be positioned on only one side of the battery cells 150, thereby simplifying the structure and improving the energy density.

Figure 4:
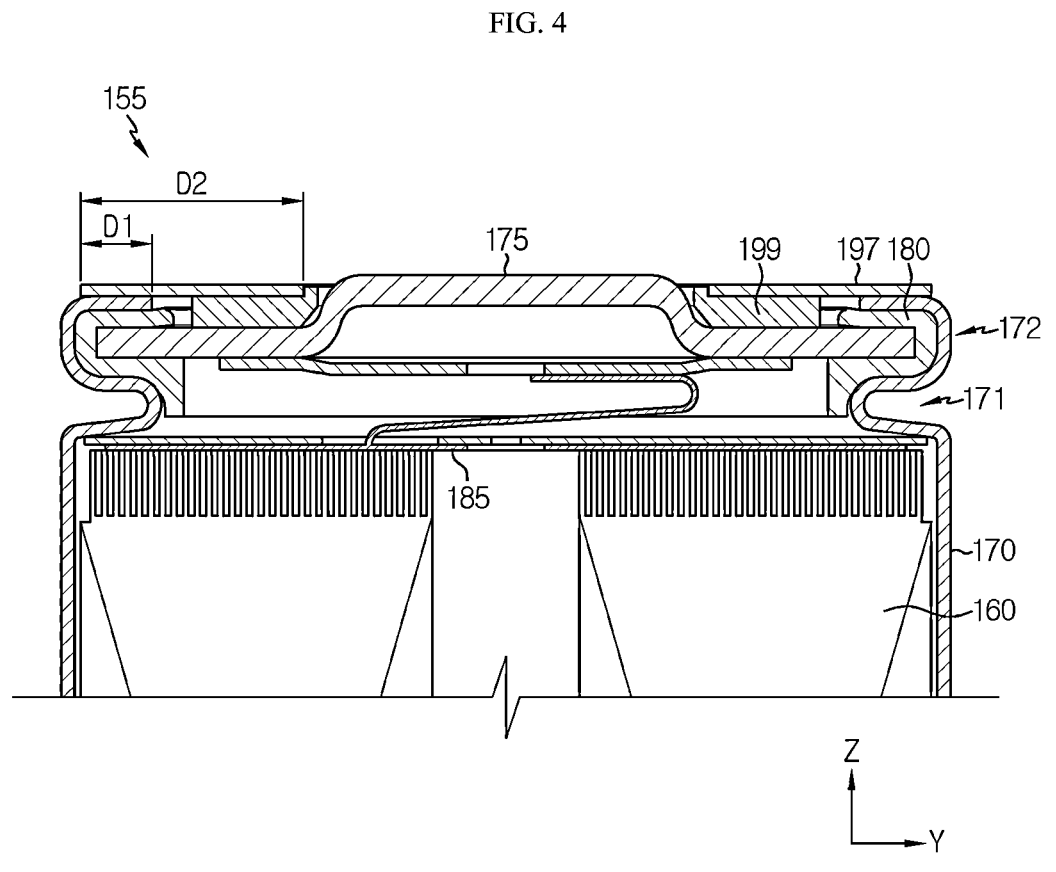

FIG. 4 is a diagram illustrating a battery cell according to another embodiment of the battery cell assembly of FIG. 3.

Since the battery cell 155 according to this embodiment is similar to the battery cell 150 of the previous embodiment, an overlapping description of the substantially identical or similar elements to the previous embodiment is omitted, and hereinafter, a description will be made based on difference(s) between this embodiment and the previous embodiment.

Referring to FIG. 4, in addition to the components of the battery cell 150 described previously, the battery cell 155 may further include a metal washer 197 and an insulation washer 199.

The metal washer 197 is a component that is made of a metal having conductive properties and is approximately in the shape of a disc having a hole at the center. The metal washer 197 is coupled on the crimping portion 172 of the battery can 170. The coupling between the metal washer 197 and the crimping portion 172 may be accomplished, for example, by laser welding.

The metal washer 197 is electrically insulated from the top cap 175. The top cap 175 is exposed through a hole formed at the center of the metal washer 197, and the metal washer 197 is spaced apart from the protrusion formed at the center of the top cap 175. Additionally, the metal washer 197 is vertically spaced apart from the remaining region except the protrusion of the top cap 175. Accordingly, the metal washer 197 may be electrically connected to the second electrode tab 164 and the battery can 170 and act as the negative electrode of the battery cell 155.

A width D2 of the metal washer 197 is larger than a width D1 of the upper surface of the crimping portion 172 of the battery can 170. In coupling the electrical connection component such as the busbar assembly 200 to the metal washer 197 to connect the plurality of battery cells 150, this is to increase the coupling area between the electrical connection component and the metal washer 197. As described above, as the coupling area between the electrical connection component and the metal washer 197 increases, the welding process may be smoothly performed, thereby improving the bonding strength between the two components and reducing the electrical resistance at the coupled part.

The insulation washer 199 is interposed between the top cap 175 and the metal washer 197. The insulation washer 199 is made of a material having insulating properties. In the battery cell 155 according to an embodiment of the present disclosure, since the top cap 175 acts as the positive electrode and the metal washer 197 acts as the negative electrode, the top cap 175 and the metal washer 197 need to maintain the electrical insulation condition. Accordingly, the insulation washer 199 may be preferably applied to stably maintain the insulation condition.

The insulation washer 199 is interposed between the lower surface of the metal washer 197 and the top cap 175. As described above, the metal washer 197 has a larger width D2 than the width D1 of the upper surface of the crimping portion 172, and is extended from the crimping portion 172 to the protrusion at the center of the top cap 175. Accordingly, the insulation washer 199 may be extended to cover the inner surface of the hole formed at the center of the metal washer 197 to prevent the contact between the inner surface of the hole formed at the center of the metal washer 197 and the protrusion of the top cap 175.

When the insulation washer 199 is made of resin, the insulation washer 199 may be coupled to the metal washer 197 and the top cap 175 by heat fusion. In this case, it is possible to enhance sealability at the coupling interface between the insulation washer 199 and the metal washer 197 and the coupling interface between the insulation washer 199 and the top cap 175.

Hereinafter, the busbar assembly 200 for electrical connection to the plurality of battery cells 150 will be described in more detail.

Figure 5:
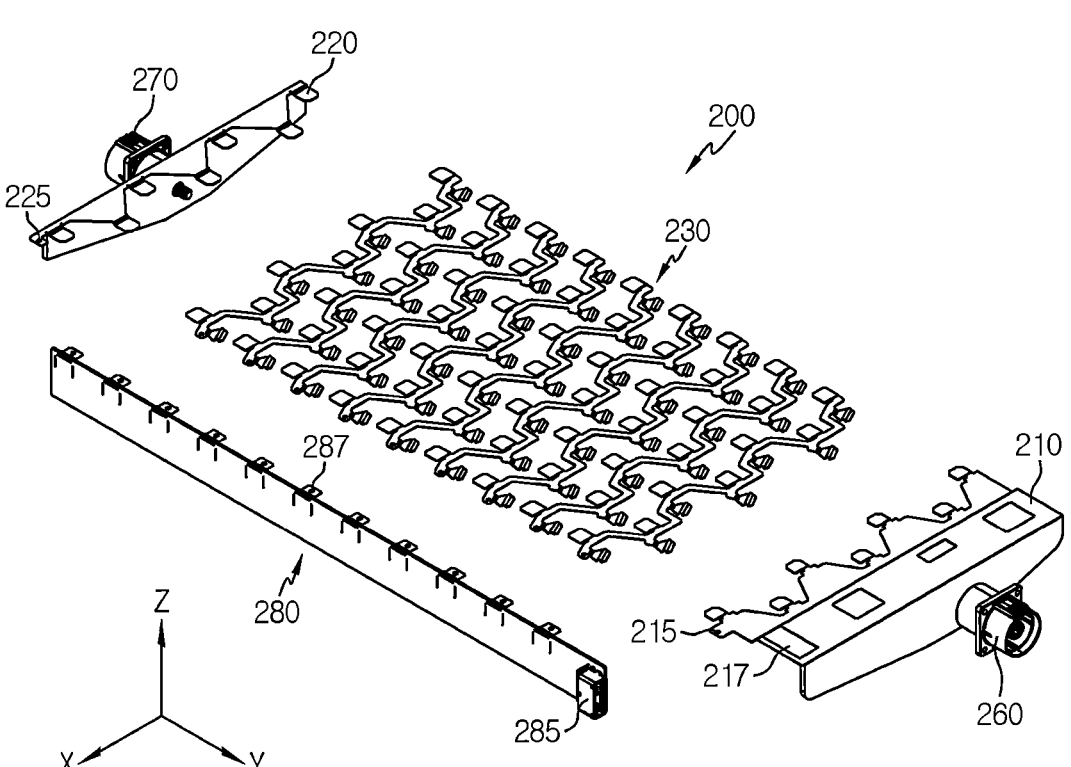
FIG. 5 is a perspective view of a busbar assembly of the battery pack of FIG. 2.
Figure 6:
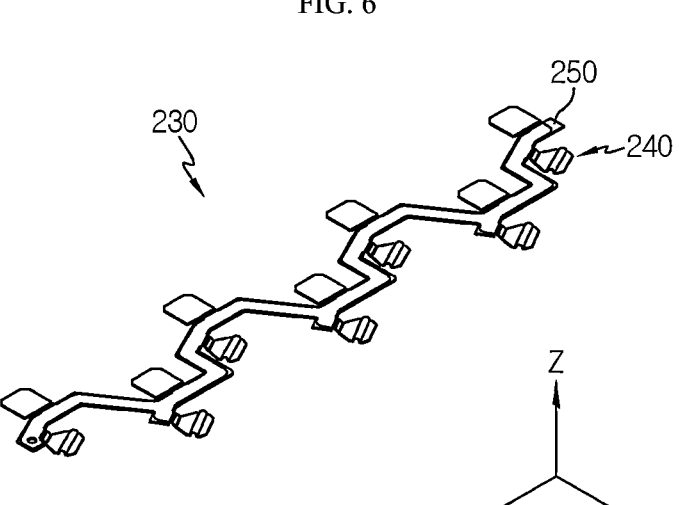
FIG. 6 is a perspective view of a connecting busbar of the busbar assembly of FIG. 5.
Figure 7:
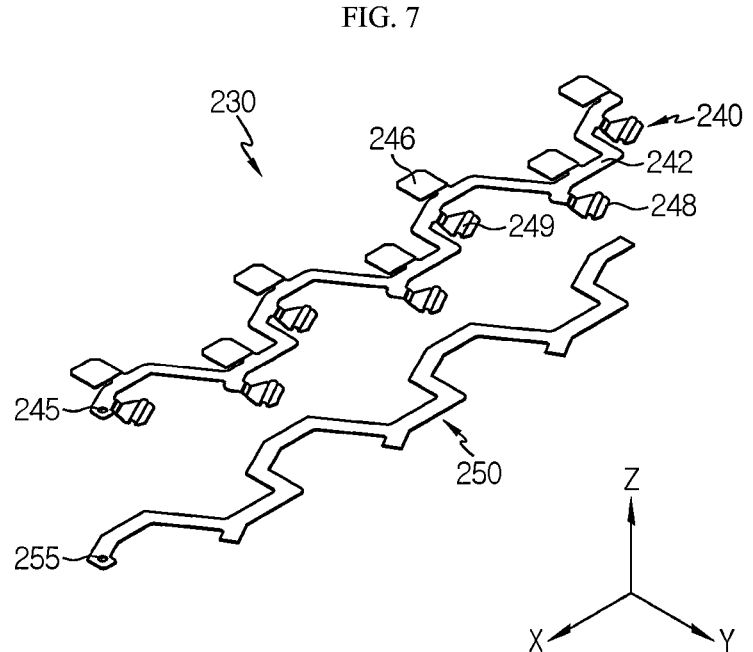
FIG. 7 is an exploded perspective view of the connecting busbar of FIG. 6.

FIG. 5 is a perspective view of the busbar assembly of the battery pack of FIG. 2, FIG. 6 is a perspective view of the connecting busbar of the busbar assembly of FIG. 5, and FIG. 7 is an exploded perspective view of the connecting busbar of FIG. 6.

Referring to FIGS. 5 to 7, the busbar assembly 200 may be provided on the battery cell assembly 100 (+Z axis direction) and electrically connected to the plurality of battery cells 150. The electrical connection of the busbar assembly 200 may be a parallel and/or series connection.

The busbar assembly 200 may be electrically connected to the positive electrode 175 (see FIG. 2) and the negative electrode 170 (see FIG. 2) of the plurality of battery cells 150 (see FIG. 2), and electrically connected to an external charge/discharge line through connectors 260, 270.

Hereinafter, the components of the busbar assembly 200 will be described in more detail.

The busbar assembly 200 may include a pair of main busbars 210, 220, a connecting busbar 230, the pair of connectors 260, 270 and an interconnection board 280.

The pair of main busbars 210, 220 may be electrically connected to the battery cell assembly 100, and may include the connectors 260, 270 connected to the external charge/discharge line.

The pair of main busbars 210, 220 may be electrically connected to the battery cells 150 positioned at two outermost sides (Y axis direction) among the battery cells 150 of the battery cell assembly 100. Specifically, each of the pair of main busbars 210, 220 may be electrically connected to the battery cells 150 positioned on the outermost sides, in the lengthwise direction (Y axis direction) of the battery cell assembly 100.

The pair of main busbars 210, 220 may include the main positive busbar 210 and the main negative busbar 220.

The main positive busbar 210 may be positioned at one side (+Y axis direction) of the busbar assembly 200 on the battery cell assembly 100 (+Z axis direction). The main positive busbar 210 may be electrically connected to the positive electrode 175 of the battery cells 150 positioned on an outermost side (+Y axis direction) of the battery cell assembly 100. The electrical connection may be established through a welding process for electrical connection such as laser welding or ultrasonic welding.

The main positive busbar 210 may include the positive connector 260 as described below for connection to the charge/discharge line. The positive connector 260 may protrude from one side (+Y axis direction) of the main positive busbar 210.

An interconnection board connection portion 215 for electrical connection to the interconnection board 280 as described below may be provided at one end (+X axis direction) of the main positive busbar 210. The interconnection board connection portion 215 may be connected to the interconnection board 280 through screw coupling or riveting.

Meanwhile, the main positive busbar 210 may have a connecting pipe through-hole 217 through which a connecting pipe 390 (see FIG. 2) as described below passes upwards above the main positive busbar 210 (+Z axis direction) to connect the connecting pipe 390 to an external cooling line.

The main negative busbar 220 may be positioned at the other side (−Y axis direction) of the busbar assembly 200 on the battery cell assembly 100 (+Z axis direction). The main negative busbar 220 may be electrically connected to the negative electrode 170 of the battery cells 150 positioned on the opposite outermost side (−Y axis direction) of the battery cell assembly 100. The electrical connection may be established through a welding process for electrical connection such as laser welding or ultrasonic welding.

The main negative busbar 220 may include the negative connector 270 as described below for connection to the charge/discharge line. The negative connector 270 may protrude from the other side (−Y axis direction) of the main negative busbar 220.

An interconnection board connection portion 225 for electrical connection to the interconnection board 280 as described below may be provided at one end (+X axis direction) of the main negative busbar 220. The interconnection board connection portion 225 may be connected to the interconnection board 280 through screw coupling or riveting.

The connecting busbar 230 is used to electrically connect the plurality of battery cells 150, and a plurality of connecting busbars 230 may be provided. The plurality of connecting busbars 230 may be electrically connected to the pair of main busbars 210, 220, and connected to the positive electrode 175 and the negative electrode 170 of the plurality of battery cells 150.

The plurality of connecting busbars 230 may be spaced a predetermined distance apart from each other along the lengthwise direction (Y axis direction) of the battery cell assembly 100. Furthermore, the plurality of connecting busbars 230 may be positioned between the main positive busbar 210 and the main negative busbar 220 in the lengthwise direction (Y axis direction) of the busbar assembly 200.

Each of the plurality of connecting busbars 230 may include a busbar layer 240 and a support layer 250.

The busbar layer 240 may be formed over a predetermined length along the widthwise direction (X axis direction) of the battery cell assembly 100 and electrically connected to the positive electrode 175 and the negative electrode 170 of the battery cells 150.

The busbar layer 240 may include a layer body 242, an interconnection board connection portion 245 and electrode connection portions 246, 248.

The layer body 242 may be formed over a predetermined length along the widthwise direction (X axis direction) of the battery cell assembly 100. The layer body 242 may be provided in a shape corresponding to the arrangement structure of the battery cells 150 in the widthwise direction (X axis direction) of the battery cell assembly 100 for electrical connection to the battery cells 150.

The layer body 242 may be made of a conductive material. For example, the layer body 242 may be made of a metal, for example, aluminum or copper. The layer body 242 is not limited thereto and may include any other material for the electrical connection.

The interconnection board connection portion 245 may be provided at one end (+X axis direction) of the layer body 242 and electrically connected to the interconnection board 280 as described below. The interconnection board connection portion 245 may be connected to the interconnection board 280 through screw coupling or riveting.

The electrode connection portions 246, 248 may protrude from the layer body 242 and may be connected to the positive electrode 175 and the negative electrode 170 of the battery cells 150. Specifically, the electrode connection portions 246, 248 may include the positive electrode connection portion 246 and the negative electrode connection portion 248.

A plurality of positive electrode connection portions 246 may be provided, and they may protrude to a predetermined size from one side (−Y axis direction) of the layer body 242, and may be spaced a predetermined distance apart from each other along the lengthwise direction (X axis direction) of the layer body 242.

The plurality of positive electrode connection portions 246 may be electrically connected to the positive electrode 175 of the battery cells 150 of the battery cell assembly 100 positioned below the busbar assembly 200 (−Z axis direction). The electrical connection may be established through a welding process for electrical connection such as laser welding or ultrasonic welding.

A plurality of negative electrode connection portions 248 may be provided, and they may protrude to a predetermined size from the other side (+Y axis direction) of the layer body 242, and may be spaced a predetermined distance apart from each other along the lengthwise direction (X axis direction) of the layer body 242. The plurality of negative electrode connection portions 248 may be arranged with the plurality of positive electrode connection portions 246 in a zigzag pattern in the lengthwise direction (Y axis direction) of the layer body 242.

The plurality of negative electrode connection portions 248 may be electrically connected to the negative electrode 170 of the battery cells 150 of the battery cell assembly 100 positioned below the busbar assembly 200 (−Z axis direction). The electrical connection may be established through a welding process for electrical connection such as laser welding or ultrasonic welding.

Each of the plurality of negative electrode connection portions 248 may have the guide groove 249. The guide groove 249 may be provided in a groove shape corresponding to an arc shape of the top edge 173 of the battery can 170 (see FIG. 3) that forms the negative electrode of the battery cell 150.

The guide groove 249 may be inserted into or placed in close contact with the top edge 173 of the battery cells 150 in the welding process for electrical connection to the negative electrode 170 of the battery cells 150, thereby making the welding process easier and improving accuracy of the welding process.

The support layer 250 may be provided on bottom (−Z axis direction) of the busbar layer 240 to support the busbar layer 240. The support layer 250 may have a shape corresponding to the layer body 250, and may be fixed in contact with the bottom (−Z axis direction) of the layer body 250.

The support layer 250 may be made of an insulating material to prevent an electrical short between the plurality of battery cells 150 and the busbar layer 240. For example, the support layer 250 may include a polyimide film. The support layer 250 is not limited thereto, and may include any other insulation member made of an insulating material.

An interconnection board connection portion 255 may be provided at one end (+X axis direction) of the support layer 250. The interconnection board connection portion 255 may be provided at a location corresponding to the interconnection board connection portion 245 of the layer body 242 and electrically connected to the interconnection board 280 as described below. The interconnection board connection portion 255 may be connected to the interconnection board 280 through screw coupling or riveting.

The pair of connectors 260, 270 is used to connect to the external charge/discharge line, and may include the positive connector 260 and the negative connector 270. The positive connector 260 may protrude from one side (+Y axis direction) of the main positive busbar 210, and the negative connector 270 may protrude from the other side (−Y axis direction) of the main negative busbar 220.

The interconnection board 280 is used to sense the voltage of the battery cells 150 of the battery cell assembly 100, and may be formed over a predetermined length in the lengthwise direction (Y axis direction) of the busbar assembly 200.

Specifically, the interconnection board 280 may measure the voltage of the battery cells 150 connected in parallel among the battery cells 150 of the battery cell assembly 100, to determine the state of charge of the battery cell assembly 100.

To this end, the interconnection board 280 may be electrically connected to an external sensing line and electrically connected to the main positive busbar 210, the main negative busbar 220 and the plurality of connecting busbars 230.

The interconnection board 280 may include a sensing connector 285 and a busbar connection portion 287.

The sensing connector 285 may be connected to the external sensing line, and may be provided at one end (+Y axis direction) of the interconnection board 280. The sensing connector 285 may be exposed from the battery pack 10 for connection to the external sensing line. The external sensing line may connect the sensing connector 285 to a battery management system (not shown). The battery management system may determine the state of charge of the battery cells connected in parallel based on the voltage of the battery cells connected in parallel.

A plurality of busbar connection portions 287 may be provided, and may be spaced a predetermined distance apart from along the lengthwise direction (Y axis direction) of the interconnection board 280.

The plurality of busbar connection portions 287 may be connected to the interconnection board connection portion 215 of the main positive busbar 210, the interconnection board connection portion 225 of the main negative busbar 220 and the interconnection board connection portions 245, 255 of the plurality of connecting busbars 230 by bolting or riveting.

Referring back to FIG. 2, the cooling unit 300 is used to cool the battery cell assembly 100, and may be positioned below the busbar assembly 200 (−Z axis direction) between the plurality of battery cells 150 along the lengthwise direction (Y axis direction) of the battery cell assembly 100.

A plurality of cooling units 300 may be provided.

The plurality of cooling units 300 may be positioned facing the plurality of battery cells 150 in the front-rear direction along the widthwise direction (X axis direction) of the plurality of battery cell assemblies 100. Here, the plurality of cooling units 300 may be positioned in contact with the facing battery cells 150 to increase the cooling performance.

Hereinafter, the cooling unit 300 will be described in more detail.

Figure 8:
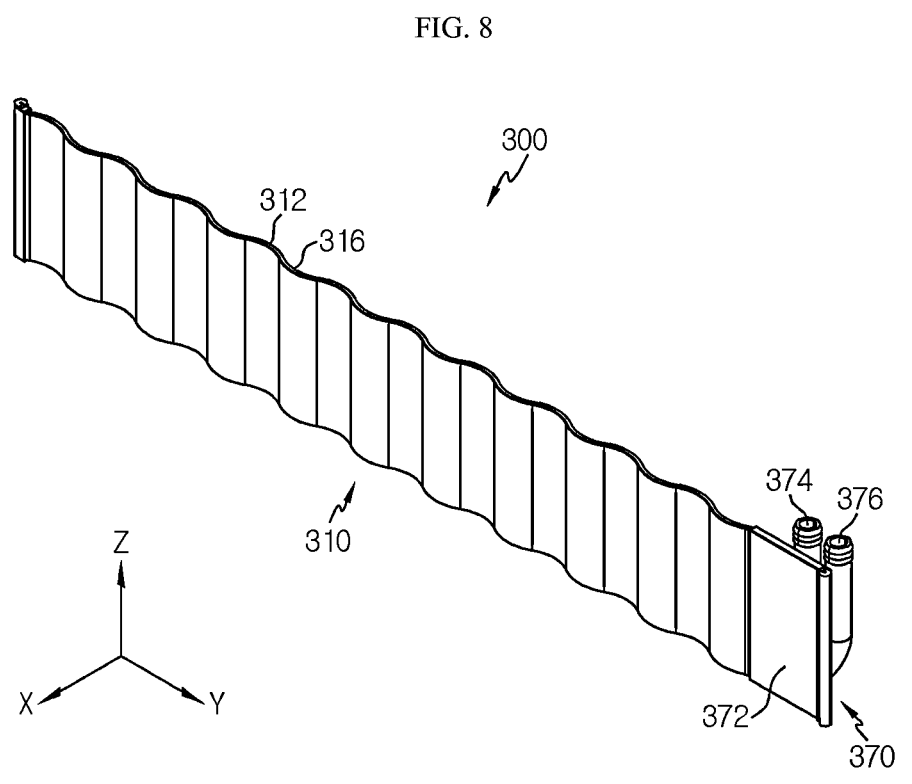
Figure 9:
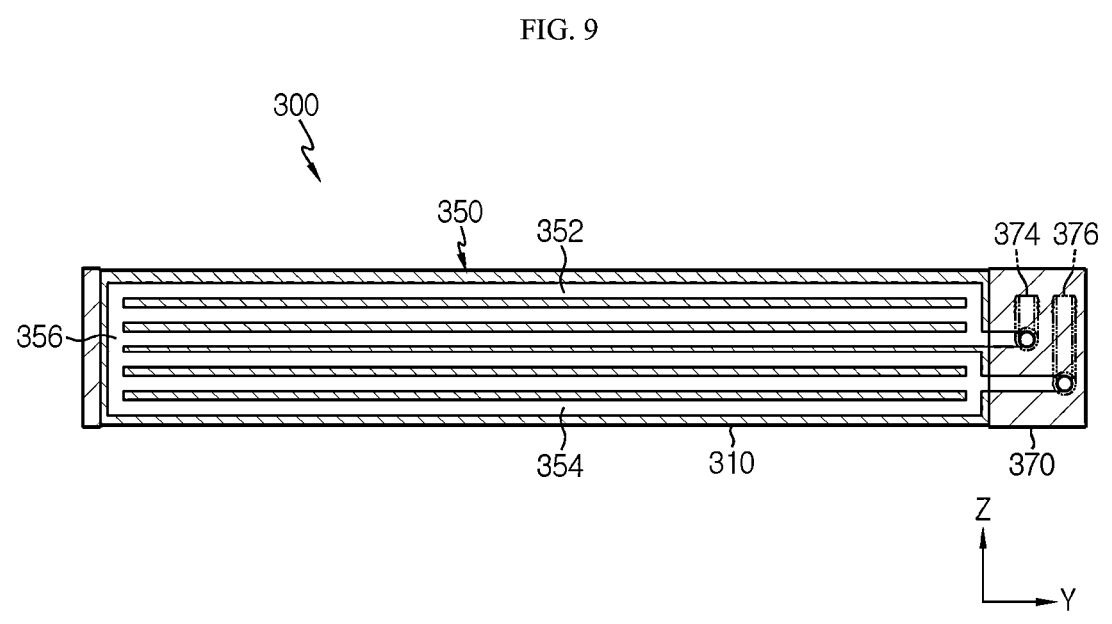
Figure 10:
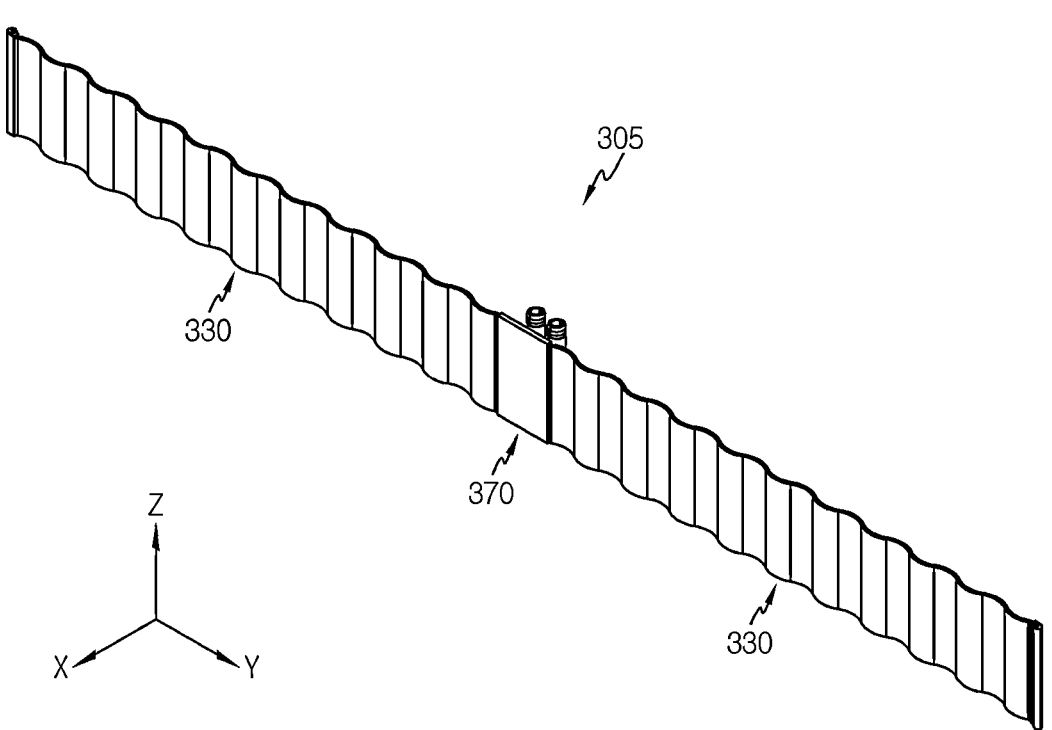
FIG. 10 is a diagram illustrating a cooling unit according to another embodiment of the present disclosure.

FIG. 8 is a perspective view of the main parts of the cooling unit of the battery pack of FIG. 2, FIG. 9 is a cross-sectional view of the main parts of the cooling unit of FIG. 8, and FIG. 10 is a diagram illustrating a cooling unit according to another embodiment of the present disclosure.

Referring to FIGS. 8 to 10 together with FIG. 2, the cooling unit 300 may include a cooling tube 310, a cooling channel 350, a cooling water entrance/exit 370 and the connecting pipe 390.

The cooling tube 310 may be formed over a predetermined length along the lengthwise direction (Y axis direction) of the battery cell assembly 100 and positioned between the plurality of battery cells 150, and may include the cooling channel 350 for cooling water circulation inside as described below.

The cooling tube 310 may be formed in a shape corresponding to the outer surface of the plurality of facing battery cells 150 in the widthwise direction (X axis direction) of the battery cell assembly 100.

The cooling tube 310 may have a plurality of convex portions 312 and convex portions 316 arranged in an alternating manner along the lengthwise direction (Y axis direction) of the battery cell assembly, the convex portions 312 and convex portions 316 formed convexly and convexly in the widthwise direction (X axis direction) of the battery cell assembly 100 respectively.

The cooling tube 310 may be positioned in contact with the outer surface of the plurality of battery cells 150 to increase the cooling performance of the battery cell assembly 100. The cooling tube 310 may be adhered and fixed to the plurality of battery cells 150 through the thermally conductive member 400 as described below or any adhesive member.

The cooling channel 350 may circulate the cooling water to cool the battery cell assembly 100, and may be provided in the cooling tube 310 and connected to the cooling water entrance/exit 370 as described below in communication with the cooling water entrance/exit 370.

The cooling channel 350 may include an upper channel 352, a lower channel 354 and a connecting channel 356.

The upper channel 352 may be provided on the cooling tube 310 close to the busbar assembly 200, and may be formed over a predetermined length along the lengthwise direction (Y axis direction) of the cooling tube 310. The upper channel 352 may be connected to a cooling water feed port 374 of the cooling water entrance/exit 370 such that it is in communication with the cooling water feed port 374.

At least one upper channel 352 may be provided. Hereinafter, in this embodiment, a description is made based on the plurality of upper channels 352 provided to ensure the cooling performance.

The lower channel 354 may be positioned below the cooling tube 310 (−Z axis direction), spaced apart from the at least one upper channel 352, and may be formed over a predetermined length along the lengthwise direction (Y axis direction) of the cooling tube 310. The lower channel 354 may be connected to a cooling water outlet port 376 of the cooling water entrance/exit 370 such that it is in communication with the cooling water outlet port 376.

At least one lower channel 354 may be provided. Hereinafter, in this embodiment, a description is made based on a plurality of lower channels 354 provided to ensure the cooling performance.

The connecting channel 356 may connect the at least one upper channel, in this embodiment, the plurality of upper channels 352 to the at least one lower channel, in this embodiment, the plurality of lower channels 354.

The connecting channel 356 may be provided at the other end (−Y axis direction) of the cooling tube 310 opposite the cooling water entrance/exit 370 to maximize the cooling channel 350.

In this embodiment, in the cooling water circulation of the cooling channel 350, the cooling water supplied from the cooling water feed port 374 may be supplied to the upper channel 352 positioned close to the busbar assembly 200, and then move to the cooling water outlet port 376 via the connecting channel 356 and the lower channel 354.

Accordingly, in this embodiment, cold cooling water is first supplied to an area near the busbar assembly 200 having a higher temperature distribution in the battery pack 10, thereby significantly improving the cooling performance of the battery cell assembly 100.

The cooling water entrance/exit 370 may be connected to the cooling tube 310 such that it is in communication with the cooling channel 350 of the cooling tube 310. The cooling water entrance/exit 370 may be connected to the connecting pipe 390 connected to the external cooling line as described below such that it is in communication with the connecting pipe 390.

The cooling water entrance/exit 370 may be provided on one side (+Y axis direction) of the lengthwise direction (Y axis direction) of the battery cell assembly 100. The cooling tube 310 connected to the cooling water entrance/exit 370 may be formed over the predetermined length from the cooling water entrance/exit 370 to the other side (−Y axis direction) of the battery cell assembly 100 in the lengthwise direction (Y axis direction) of the battery cell assembly 100.

Meanwhile, the cooling water entrance/exit 370 may be positioned between the plurality of battery cells 150 in the lengthwise direction (Y axis direction) of the battery cell assembly 100 as shown in FIG. 8. Specifically, the cooling tube 310 of each cooling unit 305 may be formed over the predetermined length from the cooling water entrance/exit 370 to two sides (Y axis direction) of the battery cell assembly 100 in the lengthwise direction (Y axis direction) of the battery cell assembly 100. That is, a bidirectional cooling structure may be provided, in which the cooling water entrance/exit 370 of the cooling unit 305 is positioned at the center and the cooling tube 330 is positioned on two sides of the cooling water entrance/exit 370 in the lengthwise direction of the battery cell assembly 100.

The cooling water entrance/exit 370 may include an entrance/exit body 372, the cooling water feed port 374 and the cooling water outlet port 376.

The entrance/exit body 372 may be connected to one end (+Y axis direction) of the cooling tube 310. The connecting pipe 390 as described below may be provided on the entrance/exit body 372 (+Z axis direction).

The cooling water feed port 374 may be provided in the entrance/exit body 372, and may be connected to the upper channel 352 such that it is in communication with the upper channel 352. The cooling water feed port 374 may be connected to the connecting pipe 390 as described below such that it is in communication with the connecting pipe 390.

The cooling water outlet port 376 may be provided in the entrance/exit body 372, and may be connected to the lower channel 354 such that it is in communication with the lower channel 354. The cooling water outlet port 376 may be spaced a predetermined distance apart from the cooling water feed port 374, and may be connected to the connecting pipe 390 as described below such that it is in communication with the connecting pipe 390.

The connecting pipe 390 may connect all the cooling water feed ports 374 of the plurality of cooling units 300 to put them in communication with each other, and connect all the cooling water outlet ports 376 of the plurality of cooling units 300 to put them in communication with each other.

The connecting pipe 390 connected to the external cooling line may supply the cooling water to the cooling water feed ports 374 of the plurality of cooling units 300, and deliver the cooling water in the cooling water outlet ports 376 of the plurality of cooling units 300 to the external cooling line.

For connection to the external cooling line, the connecting pipe 390 may be exposed from the battery pack 10 through a pipe hole 690 (see FIG. 12) of a top frame 600 as described below and the connecting pipe through-hole 217 (see FIG. 5) of the busbar assembly 200.

Referring back to FIG. 2, the thermally conductive member 400 may be filled in a space between the cooling unit 300 and the plurality of battery cells 150 in the heightwise direction (Z axis direction) of the battery pack 10. Meanwhile, in FIG. 2, the thermally conductive member 400 is indicated by a rectangular prism in a dashed line for convenience of understanding, and the thermally conductive member 400 may be fully filled in the space between the cooling unit 300 and the plurality of battery cells 150.

The thermally conductive member 400 may fix the plurality of battery cells 150 more stably and increase the heat transfer efficiency of the plurality of battery cells 150, thereby further increasing the cooling performance of the battery cells 150.

The thermally conductive member 400 may include a potting resin. The potting resin may be formed by injecting a thin resin material into the plurality of battery cells 150 and curing it. Here, the injection of the resin material may be performed at room temperature of about 15° C. to 25° C. to prevent thermal damage of the plurality of battery cells 150.

Specifically, the thermally conductive member 400 may include a silicone resin. The thermally conductive member 400 is not limited thereto, and may include any resin material other than the silicone resin, capable of fixing the battery cells 150 and improving the heat transfer efficiency of the battery cells 150.

In addition to the battery cells 150, the thermally conductive member 400 may be also filled in the busbar assembly 200. Specifically, the battery cells 150 may be filled in the busbar assembly 200 to cover at least part of the busbar assembly 200.

Here, the thermally conductive member 400 may be continuously filled in between the busbar assembly 200 and the battery cells 150 in the up/down direction (Z axis direction) of the battery cell assembly 100 without discontinuity or a gap between the busbar assembly 200 and the battery cells 150.

As described above, since the thermally conductive member 400 according to this embodiment is continuously filled in the battery cells 150 and the busbar assembly 200 without discontinuity, it is possible to achieve uniform heat distribution in the area between the battery cells 150 and the busbar assembly 200 without non-uniform heat distribution, thereby significantly increasing the cooling performance of the battery pack 10.

Referring back to FIG. 2, the battery pack 10 may further include a bottom frame 500.

Figure 11:
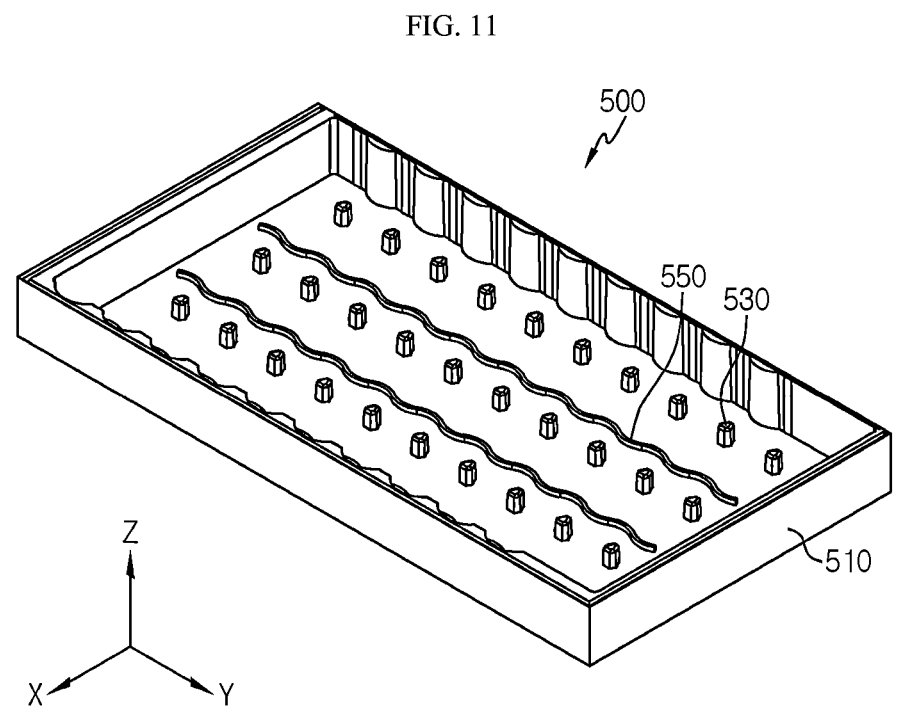

FIG. 11 is a perspective view of the bottom frame of the battery pack of FIG. 2.

Referring to FIG. 11 together with FIG. 2, the bottom frame 500 may support the battery cells 150 of the battery cell assembly 100.

The bottom frame 500 may include a bottom housing 510, a cell guide rib 530 and a cooling tube support groove 550.

The bottom housing 510 may accommodate the plurality of battery cells 150 at least in part. The bottom housing 510 may ensure the strength of the battery pack 10 and fix and support the battery cells 150 more stably.

The cell guide rib 530 is used to fix the plurality of battery cells 150 more stably, and a plurality of cell guide ribs 530 may be provided and protrude to a predetermined height (+Z axis direction) from the lower surface (−Z axis direction) of the bottom housing 510.

The cooling tube support groove 550 is used to stably fix the cooling unit 300, and may be provided in the lower surface (−Z axis direction) of the bottom housing 510 to mount the cooling tube 310 (see FIG. 8) such that the cooling tube 310 is inserted into the cooling tube support groove 550. The cooling tube support groove 550 may be formed in a shape corresponding to the bottom of the cooling tube 310 to easily mount the cooling tube 310.

Referring back to FIG. 2, the battery pack 10 may further include the top frame 600.

Figure 12:
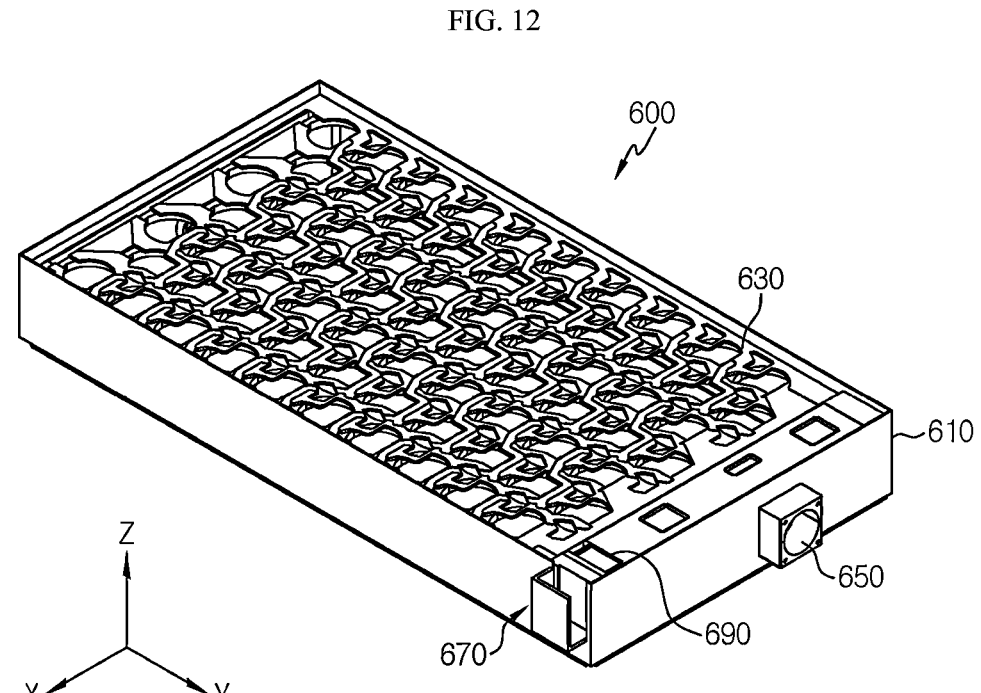
FIG. 12 is a perspective view of a top frame of the battery pack of FIG. 2.
Figure 13:
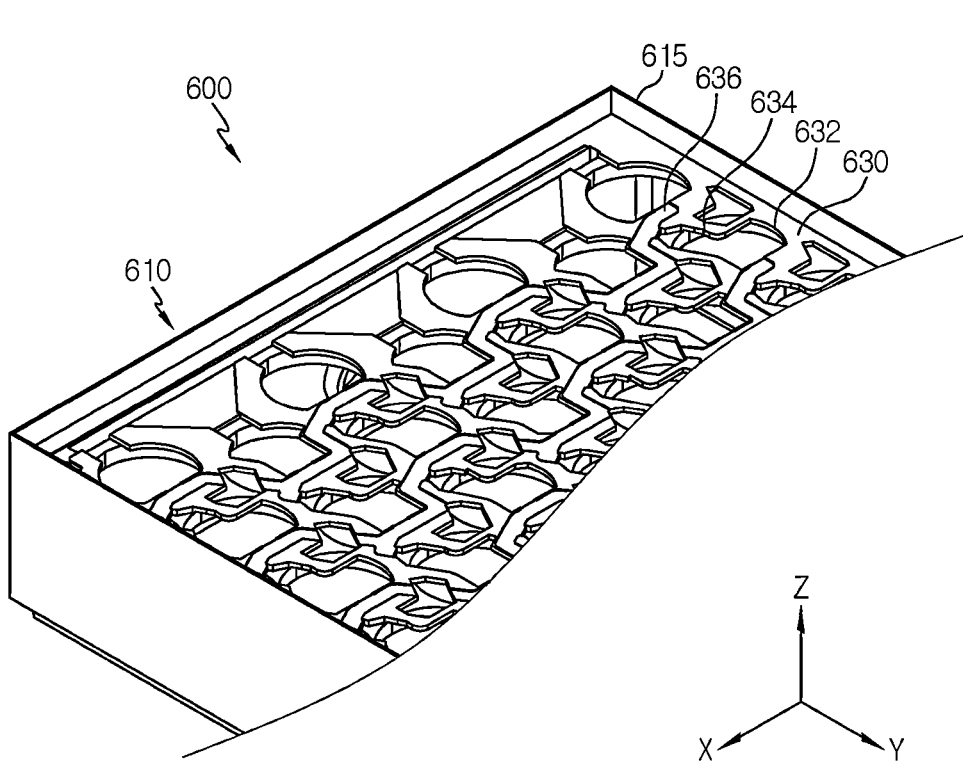
FIG. 13 is an enlarged diagram of the main parts of the top frame of FIG. 12.
Figure 14:
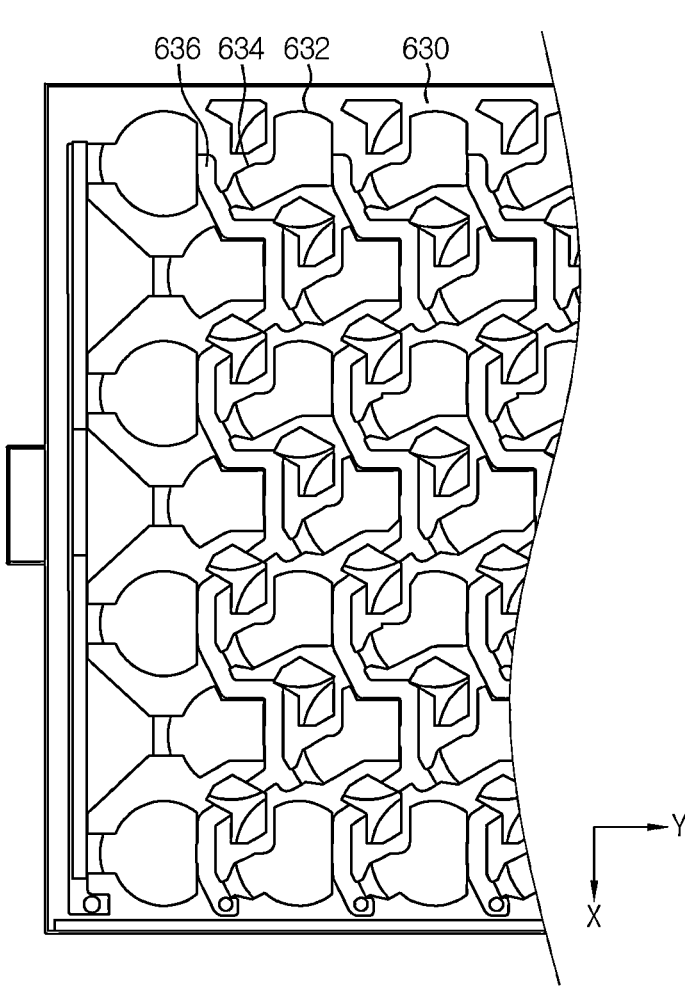
FIG. 14 is a top view of the top frame of FIG. 13.

FIG. 12 is a perspective view of the top frame of the battery pack of FIG. 2, FIG. 13 is an enlarged diagram of the main parts of the top frame of FIG. 12, and FIG. 14 is a top view of the top frame of FIG. 13.

Referring to FIGS. 12 to 14 together with FIG. 2, the top frame 600 may be provided on the bottom frame 500 to fix and support the battery cell assembly 100 and the busbar assembly 200 more stably.

The top frame 600 may include a top housing 610, a cell support 630, a connector hole 650, an interconnection board mount 670 and the pipe hole 690.

The top housing 610 may be provided on the bottom housing 510 to cover the battery cell assembly 100 and the busbar assembly 200 at least in part.

The top housing 610 may include a guide wall 615.

The guide wall 615 may be formed along the top edge of the top housing 610, and may protrude to a predetermined height (+Z axis direction) from the top edge. The guide wall 615 may guide proper injection of the thermally conductive member 400 and prevent the flooding of the thermally conductive member 400 when injecting the thermally conductive member 400 as described below.

The cell support 630 may be provided at the upper part of the top housing 610 to support the top (+Z axis direction) of the battery cells 150 of the battery cell assembly 100, and may be exposed on top (+Z axis direction) to guide the electrical connection of the battery cells 150 and the busbar assembly 200.

The cell support 630 may include a main opening 632, an extended opening 634 and a layer body seat 636.

The main opening 632 may be provided in the shape of an opening having a predetermined size, through which the top of the battery cells 150 of the battery cell assembly 100 is exposed, to guide the electrical connection between the positive electrode 175 of the battery cells 150 of the battery cell assembly 100 and the positive electrode connection portion 246 of the busbar assembly 200 and guide easier injection of the thermally conductive member 400.

The extended opening 634 may be provided in the shape of an opening that is extended to a predetermined size from one side of the main opening 632, and guide the electrical connection between the negative electrode 170 of the battery cells 150 of the battery cell assembly 100 and the negative electrode connection portion 248 of the busbar assembly 200.

The extended opening 634 may be provided in a shape corresponding to the shape of the negative electrode connection portion 248 of the busbar assembly 200. Accordingly, when placing the busbar assembly 200 in the cell support 630, it is possible to guide easier positioning of the negative electrode connection portion 248 and maximize a welding space, thereby increasing the welding convenience in the welding process and significantly improving the weld quality.

In this embodiment, it is possible to have the maximum welding space for welding of each of the positive electrode 175 and the negative electrode 170 of the battery cells 150 and the positive electrode connection portion 246 and the negative electrode connection portion 248 of the busbar assembly 200 in the welding process for electrical connection between them through the main opening 632 and the extended opening 634 extended to a predetermined size from the main opening 632 toward one side. Accordingly, in this embodiment, it is possible to improve the welding process efficiency and minimize the electrical short risk.

Furthermore, in this embodiment, it is possible to have the maximum open area in the vertical direction (Z axis direction) of the thermally conductive member 400 through the main opening 632 and the extended opening 634 when injecting and applying the thermally conductive member 400 as described below, thereby guiding smoother injection of the thermally conductive member 400, and injecting the thermally conductive member 400 down into the cell support 630 more uniformly.

The layer body seat 636 may be formed in the shape of a groove of a predetermined depth on the upper surface of the cell support 630, and the layer body 242 and the support layer 250 may be seated on the layer body seat 636.

The layer body seat 636 may be provided in a space between the main opening 632 and the extended opening 634 and may be formed to maximize the open area of the main opening 632 and the extended opening 634. In this embodiment, the layer body seat 636 may be provided in a zigzag pattern having a narrow width corresponding to the shape of the layer body 242.

As described above, the cell support 630 according to this embodiment may support the battery cells 150 on the battery cell assembly 100, and guide the electrical connection between the battery cells 150 and the busbar assembly 200.

Furthermore, the cell support 630 may maximize the open area in the vertical direction (Z axis direction) of the battery pack 10 through the main opening 632, the extended opening 634 and the layer body seat 636, thereby guiding smoother injection of the thermally conductive member 400 and maximizing the injection volume of the thermally conductive member 400 when injecting the thermally conductive member 400 as described below.

Meanwhile, the cell support 630 may further include an additional slit structure having an opening shape of a predetermined size to increase the injection process efficiency and injection volume of the thermally conductive member 400.

The connector hole 650 may be provided on two sides (Y axis direction) of the top housing 610, and allow the connectors 260, 270 to pass through such that the connectors 260, 270 are exposed from the top housing 610.

The interconnection board mount 670 is used to mount the interconnection board 280 (see FIG. 3), and may be provided on one lateral surface of the top housing 610. The interconnection board 280 may be inserted into the interconnection board mount 670 or may be adhered and fixed to the interconnection board mount 670. Here, the interconnection board mount 670 may have a sensing connector accommodation structure in which the sensing connector 285 is accommodated such that it is exposed from the battery pack 10.

The pipe hole 690 may be provided at a location corresponding to the connecting pipe through-hole 217 (see FIG. 5) of the busbar assembly 200, and may be an opening of a predetermined size to allow the connecting pipe 390 to pass through.

Hereinafter, a method for fabricating the battery pack 10 according to this embodiment will be described in more detail based on the electrical connection between the battery cell assembly 100 and the busbar assembly 200 and pack case formation through the thermally conductive member 400.

Figure 15:
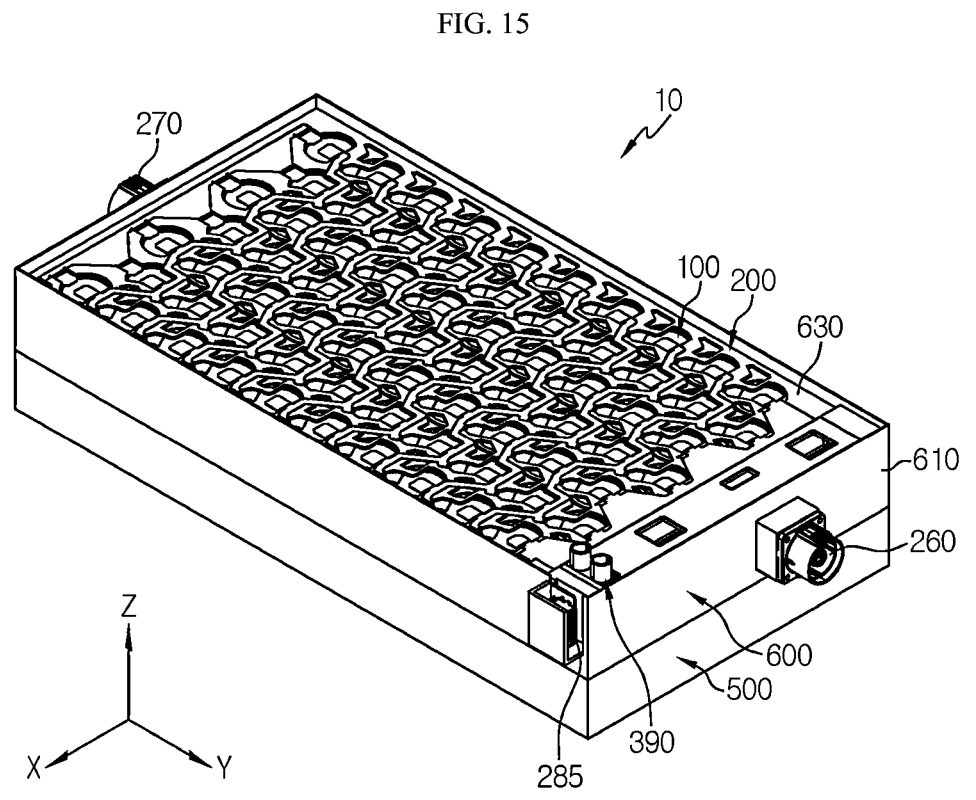
Figure 16:
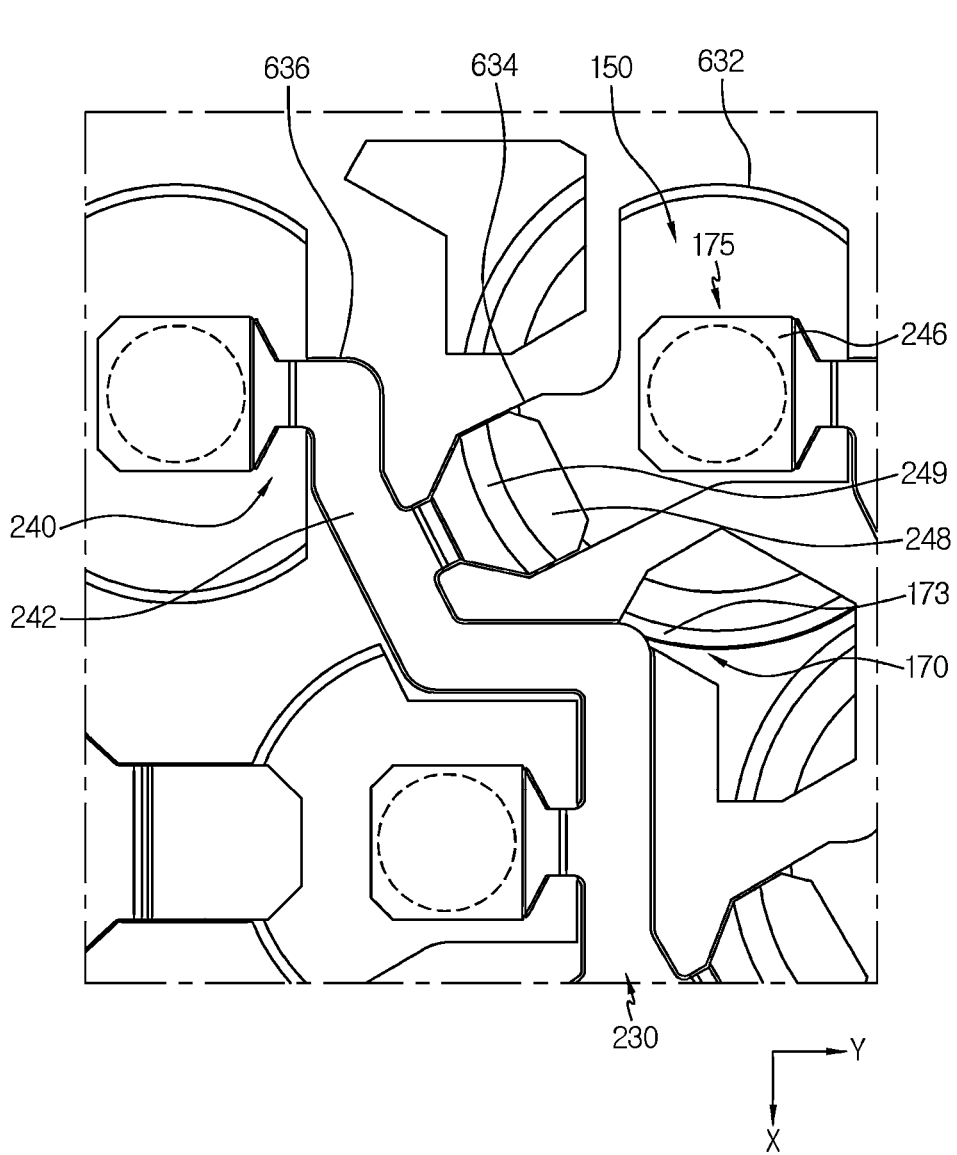

FIGS. 15 and 16 are diagrams illustrating the electrical connection between the battery cell assembly and the busbar assembly of the battery pack of FIG. 1.

Referring to FIGS. 15 and 16, in the fabrication of the battery pack 10, a manufacturer may seat the battery cell assembly 100 and the cooling unit 300 (see FIG. 2) inside through coupling between the bottom frame 500 and the top frame 600. Here, the connecting pipe 390 of the cooling unit 300 may protrude above the top housing 610 of the top frame 600.

The manufacturer may assemble the busbar assembly 200 into the top frame 600 for electrical connection of the battery cell assembly 100. Specifically, the layer bodies 242 of the connecting busbars 230 of the busbar assembly 200 may be seated on the layer body seat 636, the positive electrode connection portion 246 may be positioned on the main opening 632, and the negative electrode connection portion 248 may be positioned on the extended opening 634. Here, the guide groove 249 of the negative electrode connection portion 248 may be inserted into or placed in close contact with the top edge 173 of the negative electrode 170 of the battery cells 150.

The layer body seat 636, the main opening 632 and the extended opening 634 may guide the positioning of each component of the busbar assembly 200 before the welding process between the busbar assembly 200 and the battery cell assembly 100 and support each component of the busbar assembly 200 more stably.

Subsequently, the manufacturer may electrically connect the battery cell assembly 100 to the busbar assembly 200 through the welding process such as laser welding.

Specifically, the positive electrode 175 of the battery cells 150 may be connected to the positive electrode connection portion 246 of the busbar assembly 200 through laser welding on the main opening 632, and the negative electrode

170 of the battery cells 150 may be connected to the negative electrode connection portion 248 of the busbar assembly 200 through laser welding on the extended opening 634.

In this embodiment, the welding process for electrical connection between the positive electrode 175 and the negative electrode 170 of the battery cell assembly 100 and the busbar assembly 200 may be performed with a predetermined distance and a predetermined open area through the main opening 632 and the extended opening 634, thereby performing the welding process in a simpler manner and significantly increasing the weld quality.

Furthermore, in this embodiment, since the welding process is performed after the connecting busbars 230 is seated on the layer body seat 636 and the top edge 173 of the negative electrode 170 of the battery cells 150 is inserted into or placed in close contact with the guide groove 249 of the negative electrode connection portion 248, it is possible to fix the battery cells 150 and the busbar assembly 200 more stably during the welding, thereby improving the welding accuracy.

Figure 17:
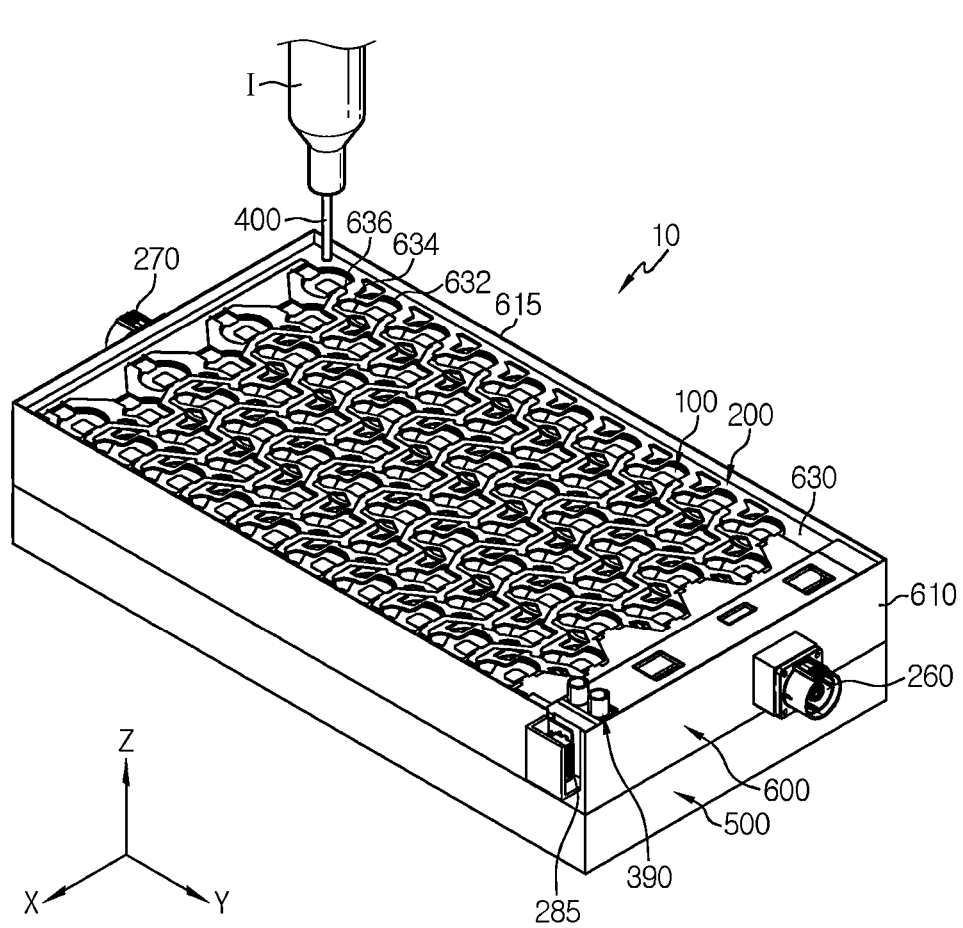
FIGS. 17 and 18 are diagrams illustrating pack case structure formation through a thermally conductive member of the battery pack of FIG. 1.
Figure 18:
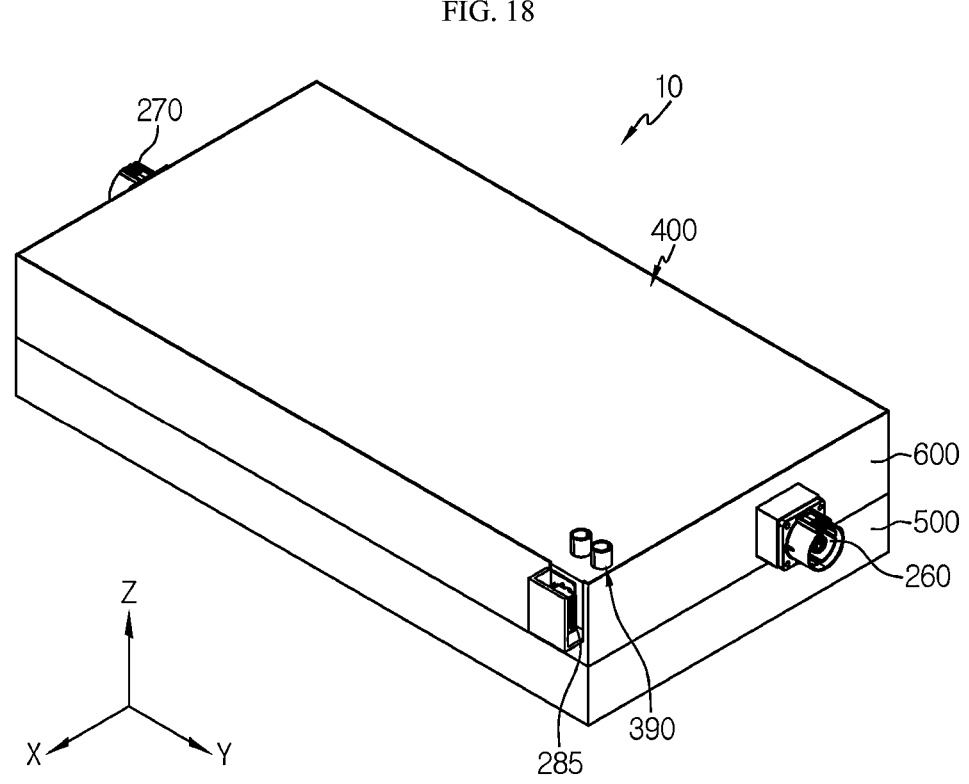

FIGS. 17 and 18 are diagrams illustrating the pack case structure formation through the thermally conductive member of the battery pack of FIG. 1.

Referring to FIGS. 17 and 18, subsequently, the manufacturer may form the pack case of the battery pack 10 through the thermally conductive member 400 made of the resin material by injecting and applying the thermally conductive member 400 through a resin injector I.

In this embodiment, when injecting the thermally conductive member 400, the bottom frame 500 and the top frame 600 may act as a mold. Accordingly, in this embodiment, it is possible to omit a structure such as the mold that is temporarily mounted and then detached afterwards when injecting the thermally conductive member 400, thereby improving the fabrication process efficiency of the battery pack 10 and significantly reducing the fabrication cost.

The guide wall 615 of the top frame 600 may prevent the flooding of the thermally conductive member 400 and adjust the injection volume of the thermally conductive member 400 when injecting the thermally conductive member 400. The manufacturer may complete the injection of the thermally conductive member 400 after injecting the thermally conductive member 400 up to the end in the vertical direction (+Z axis direction) of the guide wall 615.

Furthermore, in this embodiment, it is possible to maximize the open area on top of the battery pack 10 (+Z axis direction) through the main opening 632, the extended opening 634 and the layer body seat 636, thereby significantly improving the injection efficiency of the thermally conductive member 400 during the injection of the thermally conductive member 400.

Here, for connection of the external charge/discharge line, the external sensing line and the external cooling line, the thermally conductive member 400 may not be injected and applied to the positive connector 260, the negative connector 270, the sensing connector 285 and the top (+Z axis direction) of the connecting pipe 390.

Meanwhile, the thermally conductive member 400 may be applied to cover the side of the bottom frame 500 and the top frame 600 at least in part.

When the thermally conductive member 400 is cured, the thermally conductive member 400 may form the pack case of the battery pack 10. Accordingly, in this embodiment, since the pack case is formed through the thermally conductive member 400 made of the potting resin, compared to the conventional pack case formed as a complex assembly of a plurality of plates, it is possible to simplify the assembly process of the battery pack 10 and significantly reduce the fabrication cost, thereby improving cost competitiveness.

Furthermore, compared to the conventional cell frame structure including an assembly of a plurality of plates, in this embodiment, it is possible to reduce the total size of the battery pack 10 through the pack case structure formed from the thermally conductive member 400, thereby significantly increasing the energy density.

Figure 19:
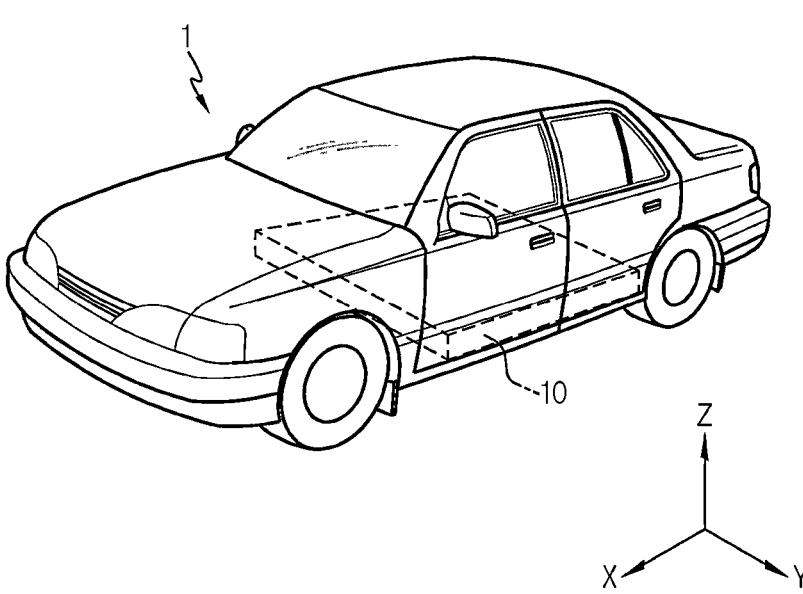
FIG. 19 is a diagram illustrating a vehicle according to an embodiment of the present disclosure.

FIG. 19 is a diagram illustrating a vehicle according to an embodiment of the present disclosure.

Referring to FIG. 19, the vehicle 1 may be an electric vehicle or a hybrid electric vehicle, and may include at least one battery pack 10 of the previous embodiment as an energy source.

In this embodiment, since the above-described battery pack 10 is provided with a compact structure having high energy density, it is easy to achieve a modularized structure of a plurality of battery packs 10 when mounting them in the vehicle 1, and it is possible to ensure a relative high degree of freedom in mounting in various inner space shapes of the vehicle 1.

According to the various embodiments as described above, it is possible to provide the battery pack 10 with increased energy density and strength and the vehicle 1 comprising the same.

Additionally, according to the various embodiments as described above, it is possible to provide the battery pack 10 with improved cost competitiveness and fabrication efficiency and the vehicle 1 comprising the same.

Furthermore, according to the various embodiments as described above, it is possible to provide the battery pack 10 with improved cooling performance and the vehicle 1 comprising the same.

While the preferred embodiment of the present disclosure has been hereinabove shown and described, the present disclosure is not limited to the above-described particular embodiment, and it is obvious to those skilled in the art that a variety of modifications may be made thereto without departing from the essence of the present disclosure claimed in the appended claims, and such modifications should not be individually understood from the technical aspect or scope of the present disclosure.

What is claimed is:

1. A battery pack, comprising:

a battery cell assembly including a plurality of battery cells;

a busbar assembly on the battery cell assembly and electrically connected to the plurality of battery cells;

a cooling unit below the busbar assembly and interposed between the plurality of battery cells along a lengthwise direction of the battery cell assembly; and a thermally conductive member disposed in a space between the cooling unit and the plurality of battery cells, wherein:

the thermally conductive member is continuous between the busbar assembly and the cooling unit in an up/down direction of the battery cell assembly;

the plurality of battery cells include a first plurality of battery cells and a second plurality of battery cells;

the first plurality of battery cells have a first outer side surface;

the second plurality of battery cells have a second outer side surface;

the second outer side surface faces the first outer side surface;

each of the plurality of battery cells has a top end and a bottom end along the up/down direction; and the cooling unit is interposed between the first outer side surface and the second outer side surface without covering the bottom ends of the plurality of battery cells, wherein the thermally conductive member is disposed in the busbar assembly to cover the busbar assembly at least in part, and wherein the thermally conductive member is continuously filled in the plurality of battery cells and the busbar assembly without discontinuity.

2. The battery pack according to claim 1, wherein the thermally conductive member includes a potting resin.

3. The battery pack according to claim 1, wherein the cooling unit includes:

a cooling tube disposed over a predetermined length along the lengthwise direction of the battery cell assembly and disposed between the plurality of battery cells, the cooling tube having a cooling channel configured to circulate cooling water inside; and a cooling water entrance/exit connected to the cooling tube such that the cooling water entrance/exit is in communication with the cooling channel of the cooling tube.

4. The battery pack according to claim 3, wherein the cooling tube has a shape corresponding to an outer surface of the plurality of battery cells.

5. The battery pack according to claim 3, wherein the cooling tube has convex and concave portions arranged in an alternating manner along the lengthwise direction of the battery cell assembly.

6. The battery pack according to claim 3, wherein the cooling water entrance/exit is on a side of the lengthwise direction of the battery cell assembly, and wherein the cooling tube disposed over a predetermined length from the cooling water entrance/exit toward an opposite side of the battery cell assembly in the lengthwise direction of the battery cell assembly.

7. The battery pack according to claim 3, wherein the cooling water entrance/exit is between the plurality of battery cells in the lengthwise direction of the battery cell assembly, and wherein the cooling tube disposed over a predetermined length from the cooling water entrance/exit toward two sides of the battery cell assembly in the lengthwise direction of the battery cell assembly.

8. The battery pack according to claim 3, wherein the cooling channel includes:

at least one upper channel on the cooling tube and formed over a predetermined length along the lengthwise direction of the cooling tube;

at least one lower channel below the cooling tube, spaced apart from the at least one upper channel, and disposed over a predetermined length along the lengthwise direction of the cooling tube; and a connecting channel connecting the at least one upper channel to the at least one lower channel.

9. The battery pack according to claim 8, wherein the cooling water entrance/exit includes:

an entrance/exit body connected to an end of the cooling tube;

a cooling water feed port in the entrance/exit body and connected to the upper channel such that the cooling water feed port is in communication with the upper channel; and a cooling water outlet port in the entrance/exit body and connected to the lower channel such that the cooling water outlet port is in communication with the lower channel.

10. The battery pack according to claim 8, wherein:

the cooling water entrance/exit is at a first end of the cooling tube;

the connecting channel is at a second end of the cooling tube; and the second end is opposite to the first end of the cooling tube.

11. The battery pack according to claim 3, wherein the cooling tube is in contact with an outer surface of the plurality of battery cells.

12. The battery pack according to claim 1, wherein the busbar assembly includes:

a pair of main busbars electrically connected to the battery cell assembly, and having a connector connected to a charge/discharge line; and a plurality of connecting busbars electrically connected to the pair of main busbars, and connected to positive and negative electrodes of the plurality of battery cells.

13. A vehicle comprising at least one battery pack according to claim 1.

14. The battery pack according to claim 1, wherein:

the first outer side surface is disposed along the lengthwise direction and the up/down direction;

the second outer side surface is along the lengthwise direction and the up/down direction; and the top end is a first position along the up/down direction, the bottom end is a second position along the up/down direction, and the second position is different from the first position.

15. The battery pack according to claim 1, wherein:

the first plurality of battery cells are disposed in a first row along the lengthwise direction and the second plurality of battery cells are disposed in a second row along the lengthwise direction; and the first row is at a first position along a widthwise direction, the second row is at a second position along the widthwise direction, and the second row is different from the first row.

16. The battery pack according to claim 1, wherein the cooling unit is configured to receive cooling liquid.

17. The battery pack according to claim 1, further comprising:

a top frame; and a bottom frame, wherein:

the top frame and the bottom frame cover the plurality of battery cells; and the thermally conductive member covers at least a part of a side of the bottom frame and at least a part of the top frame.

18. The battery pack according to claim 1, wherein each of a cooling water feed port and a cooling water outlet port extends along the up/down direction that is perpendicular to the lengthwise direction of the battery cell assembly.

\* \* \* \* \*